(12) United States Patent
Lee et al.

(10) Patent No.: US 12,058,392 B2
(45) Date of Patent: Aug. 6, 2024

(54) METHOD AND DEVICE FOR TRANSMITTING VIDEO CONTENT BY USING EDGE COMPUTING SERVICE

(71) Applicant: Samsung Electronics Co., Ltd., Suwon-si (KR)

(72) Inventors: Boyoung Lee, Suwon-si (KR); Koanmo Kim, Suwon-si (KR); Eunji Kim, Suwon-si (KR); Jiwon Kim, Suwon-si (KR); Jaehong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 17/603,134

(22) PCT Filed: Sep. 17, 2021

(86) PCT No.: PCT/KR2021/012837
§ 371 (c)(1),
(2) Date: Oct. 12, 2021

(87) PCT Pub. No.: WO2022/060175
PCT Pub. Date: Mar. 24, 2022

(65) Prior Publication Data
US 2022/0312057 A1 Sep. 29, 2022

(30) Foreign Application Priority Data
Sep. 21, 2020 (KR) .......... 10-2020-0121792

(51) Int. Cl.
*H04N 21/2343* (2011.01)
*H04N 21/218* (2011.01)
*H04N 21/81* (2011.01)

(52) U.S. Cl.
CPC .......... *H04N 21/234345* (2013.01); *H04N 21/21805* (2013.01); *H04N 21/816* (2013.01)

(58) Field of Classification Search
CPC ..... H04N 21/234345; H04N 21/21805; H04N 21/816
See application file for complete search history.

(56) References Cited

U.S. PATENT DOCUMENTS 9,280,204 B2  3/2016  Kim et al.
9,940,518 B1* 4/2018  Klingström .......... G06V 40/193
(Continued)

FOREIGN PATENT DOCUMENTS

CN  105392538 A  3/2016
KR  10-2017-0015938 A  2/2017
(Continued)

OTHER PUBLICATIONS

International Search Report dated Dec. 20, 2021, issued in International Application No. PCT/KR2021/012837.
(Continued)

*Primary Examiner* — James R Sheleheda
(74) *Attorney, Agent, or Firm* — Jefferson IP Law, LLP

(57) ABSTRACT

A method of transmitting video content by using an edge computing service (e.g., a multi-access edge computing (MEC) service) is provided. The method includes obtaining sensor information including orientation information and pupil position information from an electronic device connected to the edge data network, obtaining a first partial image including a user field-of-view image and an extra field-of-view image, the user field-of-view image corresponding to the orientation information, and the extra field-of-view image corresponding to the pupil position informa-
(Continued)

tion, generating a first frame by encoding the first partial image, and transmitting the generated first frame to the electronic device.

16 Claims, 20 Drawing Sheets

(56) References Cited

U.S. PATENT DOCUMENTS

| | | | | |
|---|---|---|---|---|
| 10,687,050 | B2* | 6/2020 | Hildreth | H04N 13/344 |
| 10,712,555 | B2* | 7/2020 | Schilt | G02B 27/0093 |
| 2013/0141523 | A1* | 6/2013 | Banta | H04N 21/4728 348/36 |
| 2014/0267420 | A1* | 9/2014 | Schowengerdt | G02B 27/0172 345/633 |
| 2014/0313124 | A1* | 10/2014 | Kim | G06V 40/18 345/156 |
| 2015/0077329 | A1* | 3/2015 | Yoon | G06F 21/30 345/156 |
| 2015/0235632 | A1 | 8/2015 | Liu et al. | |
| 2015/0346812 | A1* | 12/2015 | Cole | H04N 19/597 345/156 |
| 2016/0217760 | A1* | 7/2016 | Chu | H04N 13/161 |
| 2017/0068315 | A1* | 3/2017 | Kang | G06V 40/193 |
| 2017/0289219 | A1* | 10/2017 | Khalid | H04N 21/234363 |
| 2017/0293356 | A1* | 10/2017 | Khaderi | G02B 27/0172 |
| 2018/0047332 | A1* | 2/2018 | Kuwahara | G09G 3/2096 |
| 2018/0157320 | A1 | 6/2018 | Trail | |
| 2018/0160119 | A1* | 6/2018 | Su | H04N 19/597 |
| 2018/0176535 | A1* | 6/2018 | Ninan | H04N 21/44218 |
| 2018/0192001 | A1* | 7/2018 | Boyce | H04N 19/46 |
| 2018/0279006 | A1 | 9/2018 | Cole et al. | |
| 2018/0342066 | A1* | 11/2018 | Mallinson | G06F 3/015 |
| 2018/0349698 | A1* | 12/2018 | Gustafsson | G06V 40/19 |
| 2019/0200058 | A1* | 6/2019 | Hall | H04N 23/698 |
| 2019/0253692 | A1* | 8/2019 | El-Imad | H04N 13/344 |
| 2019/0310472 | A1* | 10/2019 | Schilt | G06F 3/015 |
| 2019/0354174 | A1* | 11/2019 | Young | G09G 5/393 |
| 2019/0356894 | A1* | 11/2019 | Oh | H04N 21/234345 |
| 2020/0128280 | A1* | 4/2020 | Han | H04N 21/251 |
| 2020/0225473 | A1* | 7/2020 | Selan | G02B 27/0172 |
| 2020/0322403 | A1* | 10/2020 | Dvir | H04N 21/2402 |
| 2020/0333609 | A1* | 10/2020 | Leister | G03H 1/2205 |
| 2020/0409457 | A1* | 12/2020 | Terrano | G06F 3/013 |
| 2021/0213355 | A1 | 7/2021 | Marks et al. | |
| 2021/0240258 | A1* | 8/2021 | Son | G02B 27/017 |
| 2021/0274155 | A1 | 9/2021 | Yun et al. | |
| 2022/0182594 | A1* | 6/2022 | Phillips | H04N 13/161 |
| 2022/0191453 | A1* | 6/2022 | Wang | H04N 21/234327 |
| 2023/0008596 | A1 | 1/2023 | Shanware | |
| 2023/0011586 | A1* | 1/2023 | Hari Haran | H04N 13/349 |

FOREIGN PATENT DOCUMENTS

| | | | | |
|---|---|---|---|---|
| KR | 10-2018-0052255 A | | 5/2018 | |
| KR | 10-2019-0002416 A | | 1/2019 | |
| KR | 1965746 B1 | | 4/2019 | |
| KR | 10-2012254 B1 | | 8/2019 | |
| KR | 10-2020-0076109 A | | 6/2020 | |
| WO | WO-2010062481 A1 * | | 6/2010 | G02B 27/017 |
| WO | WO-2014144526 A2 * | | 9/2014 | G02B 27/0093 |
| WO | WO-2020237921 A1 * | | 12/2020 | G06V 40/19 |

OTHER PUBLICATIONS

Yu Fang et al, "Eye-Head Coordination for Visual Cognitive Processing", Mar. 2015.

* cited by examiner

FIG. 12
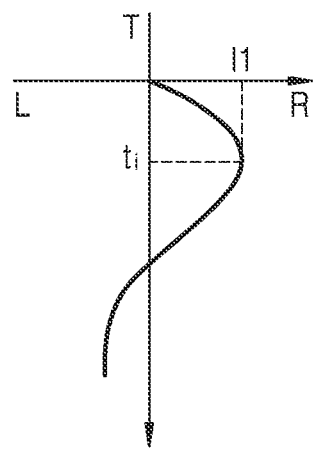
MOVING DISTANCE OF PUPIL OVER TIME
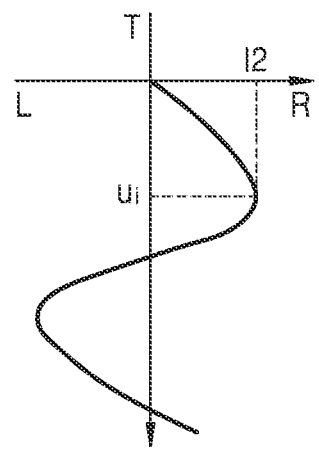
MOVING DISTANCE OF HEAD (ELECTRONIC DEVICE) OVER TIME

METHOD AND DEVICE FOR TRANSMITTING VIDEO CONTENT BY USING EDGE COMPUTING SERVICE

TECHNICAL FIELD

The disclosure relates to a method and a device for transmitting video content by using an edge computing service (e.g., a multi-access edge computing (MEC) service).

BACKGROUND ART

Recently, edge computing technology for transmitting data by using an edge server has been discussed. Edge computing technology may include, for example, multi-access edge computing (MEC) or fog computing (FOC). Edge computing technology is technology for providing data to an electronic device via a separate server (hereinafter referred to as 'edge data network' or 'MEC server') provided at a location geographically close to the electronic device, for example, inside or around a base station. For example, an application requiring low latency among at least one application installed in an electronic device may transmit and receive data via an edge server provided at a geographically close location, without passing through a server located in an external data network (DN) (e.g., the Internet).

Recently, a service using edge computing technology (hereinafter referred to as 'MEC-based service' or 'MEC service') has been discussed, and research and development of electronic devices to support MEC-based services have been conducted. For example, an application of an electronic device may transmit and receive edge computing-based data to and from an edge server (or an application of the edge server) in an application layer.

Along with the progress of research and development to support MEC-based services, techniques for providing high-resolution video content to an electronic device by using MEC have been discussed.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide a method and a device for transmitting video content by using an edge computing service.

Another aspect of the disclosure is to provide a method, performed by an edge data network, of transmitting video content to an electronic device and the edge data network for providing video content to the electronic device.

Another aspect of the disclosure is to provide a method, performed by an electronic device, of receiving video content from an edge data network and the electronic device for receiving video content from the edge data network.

Additional aspects will be set forth in part in the description which follows and, in part, will be apparent from the description, or may be learned by practice of the presented embodiments.

In accordance with an aspect of the disclosure, a method, performed by an edge data network, of transmitting video content is provided. The method includes obtaining sensor information including orientation information and pupil position information from an electronic device connected to the edge data network, obtaining a first partial image including a user field-of-view image corresponding to the orientation information and an extra field-of-view image corresponding to the pupil position information, generating a first frame by encoding the first partial image, and transmitting the generated first frame to the electronic device.

The user field-of-view image may be an image having a user field of view identified based on information about a viewport area of a display of the electronic device, based on a position in a virtual reality (VR) image indicated by the orientation information.

The first partial image may be a partial image in a first VR image having a predetermined frame index of a VR sequence including a plurality of frames, and the first partial image may be related to orientation information indicating a position of the partial image.

The extra field-of-view image corresponding to the pupil position information may be an image having an extra field of view identified based on coordinates of a position of a pupil with respect to a reference point indicated by the pupil position information.

An extra field of view may be identified based on a pupil direction and a pupil distance identified from coordinates of a center in an entire user eye area and the coordinates of the position of the pupil, and the extra field-of-view image may be an image having the identified extra field of view.

An extra field of view corresponding to at least one of a horizontal component or a vertical component of the coordinates of the position of the pupil with respect to at least one of a width or a height of an entire user eye area may be identified, and the extra field-of-view image may be an image having the identified extra field of view.

Left and right first extra fields of view corresponding to the horizontal component of the position of the pupil and upper and lower second extra fields of view corresponding to the vertical component of the position of the pupil may be identified, and the extra field-of-view image may be an image having the identified left and right first extra fields of view and the identified upper and lower second extra fields of view.

The left or right extra field of view of the first extra fields of view may be greater than or equal to a first minimum field of view, and the upper or lower extra field of view of the second extra fields of view may be greater than or equal to a second minimum field of view, and the first minimum field of view and the second minimum field of view may be preset.

An extra field of view in a direction corresponding to the pupil direction based on a user field of view may be greater than an extra field of view in a direction opposite to the direction corresponding to the pupil direction.

The extra field-of-view image corresponding to the pupil position information may be an image having an extra field of view identified based on at least one of a previous position of the pupil, a period of time during which the position of the pupil is in a predetermined area, or a speed of movement of the pupil.

The extra field-of-view image corresponding to the pupil position information may be an image having an extra field of view identified based on a ratio of a pupil position l1 when a position of the pupil over time is a local maximum or a local minimum, to an electronic device position l2 when a position of the electronic device over time is a local maximum or a local minimum.

The extra field-of-view image corresponding to the pupil position information may be an image having an extra field of view identified based on a field of view weight of a predetermined direction based on a position of the pupil and a displacement direction of the electronic device.

The extra field-of-view image corresponding to the pupil position information may be an image having an extra field of view identified based on a difference between a point of time t1 at which the position of the pupil over time is a local maximum or a local minimum, and a point of time t2 at which a position of the electronic device over time is a local maximum or a local minimum.

Based on information about a type of video content related to the first partial image received by the electronic device, an extension weight of an extra field of view and a sensitivity of a sensor included in the electronic device may be identified, and information about the extension weight of the extra field of view and the sensitivity of the sensor may be transmitted to the electronic device.

The first partial image may be composed of data units of a preset field-of-view range, and
  the generating of the first frame by encoding the first partial image may include
  encoding a first data unit of at least one preset field-of-view range corresponding to the user field-of-view image in the first partial image, and a second data unit of at least one preset field-of-view range corresponding to the extra field-of-view image in the first partial image, and
  generating the first frame including the encoded first data unit and the encoded second data unit.

In accordance with another aspect of the disclosure, an edge data network for transmitting video content to an electronic device is provided. The edge data network includes
  a network interface,
  a memory storing one or more instructions, and
  a processor configured to execute the one or more instructions. The processor is further configured, by executing the one or more instructions,
  to obtain sensor information including orientation information and pupil position information from an electronic device connected to the edge data network,
  obtain a first partial image including a user field-of-view image corresponding to the orientation information and an extra field-of-view image corresponding to the pupil position information,
  generate a first frame by encoding the first partial image, and transmit the generated first frame to the electronic device.

The extra field-of-view image corresponding to the pupil position information may be an image having an extra field of view identified based on coordinates of a position of a pupil with respect to a reference point indicated by the pupil position information.

The extra field-of view image may be,
Left and right first extra fields of view corresponding to a horizontal component of the position of the pupil and upper and lower second extra fields of view corresponding to a vertical component of the position of the pupil may be identified, and the extra field-of-view image may be an image having the identified left and right first extra fields of view and the identified upper and lower second extra fields of view.

The left or right extra field of view of the first extra fields of view may be greater than or equal to a first minimum field of view, and the upper or lower extra field of view of the second extra fields of view may be greater than or equal to a second minimum field of view, and the first minimum field of view and the second minimum field of view may be preset.

An extra field of view in a direction corresponding to a pupil direction based on a user field of view may be greater than an extra field of view in a direction opposite to the direction corresponding to the pupil direction.

According to an embodiment of the disclosure, in a computer-readable recording medium having recorded thereon a program for executing a method, performed by an edge data network,
  the method including
  obtaining sensor information including orientation information and pupil position information from an electronic device connected to the edge data network,
  obtaining a first partial image including a user field-of-view image corresponding to the orientation information and an extra field-of-view image corresponding to the pupil position information,
  generating a first frame by encoding the first partial image, and
  transmitting the generated first frame to the electronic device.

Technical Solution to Problem

Various embodiments of the disclosure provide a method of effectively performing an operation based on video content between an edge data network and an electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 12 is a diagram illustrating a process, performed by an edge data network, of identifying an extra FoV based on movement patterns of a pupil and the head (an electronic device) of a user, according to an embodiment of the disclosure;

Throughout the drawings, it should be noted that like reference numbers are used to depict the same or similar elements, features, and structures.

MODE OF DISCLOSURE

Figure 1:
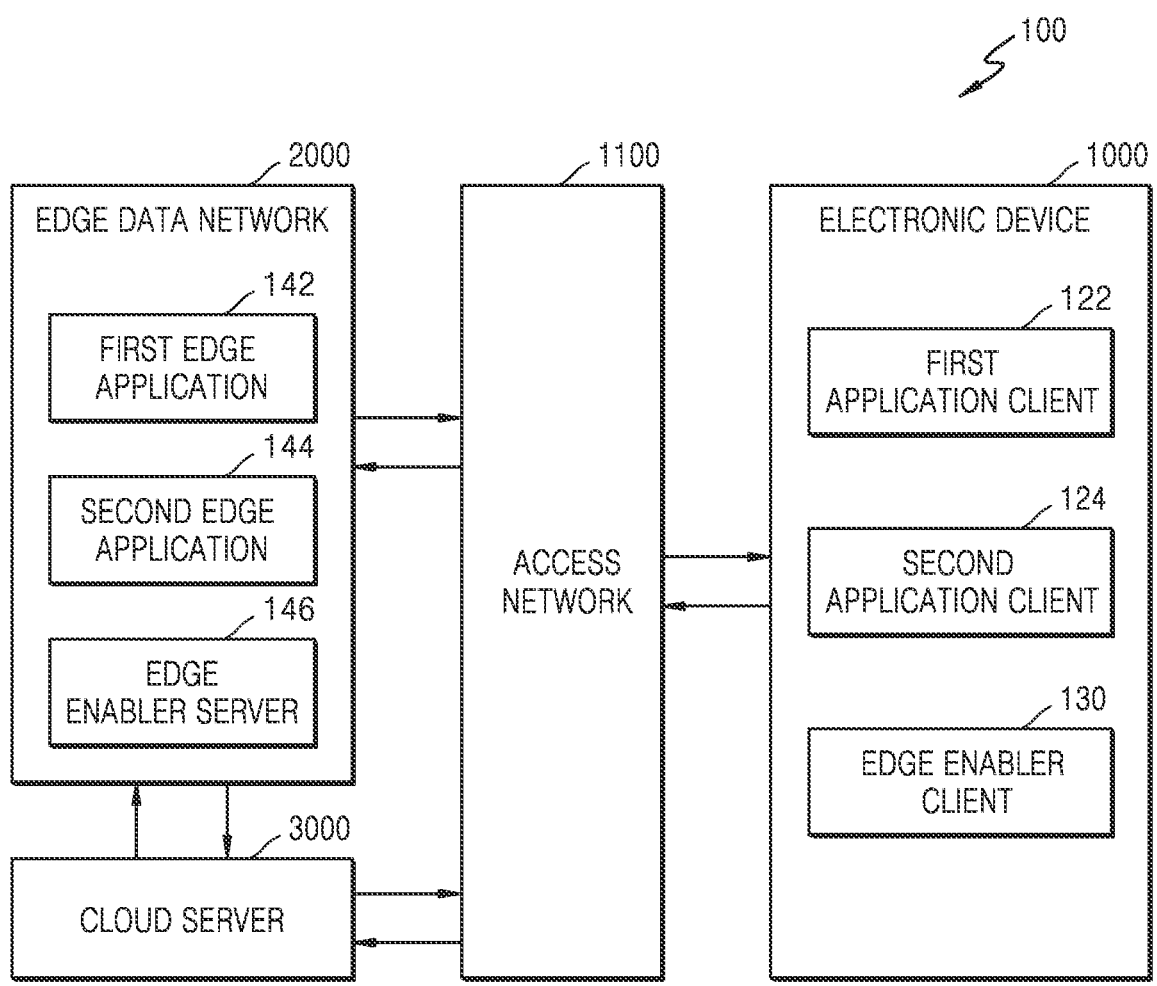
FIG. 1 is a diagram schematically illustrating multi-access edge computing (MEC) technology in a network environment, according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

In the description of embodiments, technical features that are well known to the technical field to which the disclosure belongs and are not directly associated with the disclosure are not described. This is not to obscure but to clearly deliver the gist of the disclosure by omitting an unnecessary description.

Likewise, in the accompanying drawings, some components are exaggerated, omitted, or schematically shown. In addition, sizes of components do not fully reflect actual sizes thereof. Like reference numbers are used to refer to like elements through at the drawings.

Advantages and features of the disclosure and a method for achieving them will be clear with reference to the accompanying drawings, in which various embodiments are shown. The disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art, and the disclosure will be defined only by the concept of the claims. Like reference numerals denote like elements throughout the specification.

It could be understood that each block in processing flowchart drawings and combinations of flowchart drawings may be performed by computer program instructions. These computer program instructions may be loaded in a processor of a general-purpose computer, a particular-purpose computer, or other programmable data processing equipment, and thus, the instructions performed by a processor of a computer or other programmable data processing equipment generates a means configured to perform functions described in flowchart block(s). These computer program instructions may also be stored in a computer-executable or computer-readable memory capable of orienting a computer or other programmable data processing equipment to implement a function in a particular mode, and thus, the instructions stored in the computer-executable or computer-readable memory may also produce a production item involving an instruction means configured to perform a function described in flowchart block(s). These computer program instructions may also be loaded in a computer or other programmable data processing equipment, and thus, a computer-executable process may also be generated by performing a series of operations on the computer or the other programmable data processing equipment so that the instructions executed in the computer or the other programmable data processing equipment provide operations for executing functions described in flowchart block(s).

In addition, each block may indicate a portion of a module, a segment, or a code including one or more executable instructions for executing particular logical function(s). Also, in several substitutional embodiments, functions described in blocks may also be out of a sequence. For example, two consecutively shown blocks may be substantially performed at the same time in fact, or the blocks may be sometimes performed in a reverse order according to a corresponding function.

The term ' . . . unit' used in the embodiments of the disclosure indicates a component including software or hardware, such as a field programmable gate array (FPGA) or an application-specific integrated circuit (ASIC), and the ' . . . unit' performs certain roles. However, the ' . . . unit' is not limited to software or hardware. The ' . . . unit' may be configured to be included in an addressable storage medium or to reproduce one or more processors. Therefore, for example, the ' . . . unit' includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and ' . . . units' may be combined into a smaller number of components and ' . . . units' or be further divided into additional components and ' . . . units'. In addition, components and ' . . . units' may be implemented to reproduce one or more central processing units (CPUs) inside a device or a security multimedia card. In addition, in an embodiment of the disclosure, the ' . . . unit' may include one or more processors.

FIG. 1 is a diagram schematically illustrating multi-access edge computing (MEC) technology in a network environment, according to an embodiment of the disclosure.

Referring to FIG. 1, the network environment 100 may include an electronic device 1000, an edge data network 2000, a cloud server 3000, and an access network (AN) 1100. However, the components included in the network environment 100 are not limited thereto.

According to an embodiment of the disclosure, each of the components included in the network environment 100 may refer to a physical entity unit, or a software or module unit capable of performing an individual function.

According to an embodiment of the disclosure, the electronic device 1000 may refer to a device used by a user. For example, the electronic device 1000 may refer to a terminal, a user equipment (UE), a mobile station, a subscriber station, a remote terminal, a wireless terminal, or a user device.

The electronic device 1000 may be a terminal for providing content so as for a user to be immersed in a virtual environment including at least one of virtual reality (VR), augmented reality (AR), or mixed reality (MR). That is, according to an embodiment of the disclosure, the electronic device 1000 may be a head-mounted display (HMD) or a virtual reality headset (VRH) for providing content for VR, AR, or MR.

Referring to FIG. 1, the electronic device 1000 may include a first application client (or an application client) 122, a second application client 124, and an edge enabler client (or an MEC enabling layer (MEL)) 130. The electronic device 1000 may perform a necessary operation by using the edge enabler client 130, to use an MEC service. A detailed description of the edge enabler client 130 will be made below.

According to an embodiment of the disclosure, the electronic device 1000 may execute a plurality of applications. For example, the electronic device 1000 may execute the first application client 122 and the second application client 124. The plurality of applications may require different network services based on at least one of a required data transmission rate, a latency (or a speed), reliability, the number of electronic devices having accessed a network, a network access period of the electronic device 1000, or an average data use amount. The different network services may include, for example, an enhanced mobile broadband (eMBB) service, an ultra-reliable and low latency communication (URLLC) service, or a massive machine-type communication (mMTC) service.

An application client of the electronic device 1000 may refer to a default application previously installed in the electronic device 1000 or an application provided by a third party. An application client of the electronic device 1000 may refer to a client application program running in the electronic device 1000 for a particular application service. Several application clients may run in the electronic device 1000. At least one of the application clients may use a service provided by the edge data network 2000. For example, an application client may be an application installed and executed in the electronic device 1000 and may provide a function of transmitting and receiving data via the edge data network 2000. An application client in the electronic device 1000 may refer to application software executed in the electronic device 1000 to use a function provided by one or more particular edge applications.

According to an embodiment of the disclosure, the plurality of applications, e.g., the first and second application clients 122 and 124, in the electronic device 1000 may perform data transmission and reception with the cloud server 3000 based on a required network service type or perform data transmission and reception with the edge data network 2000 based on edge computing. For example, when the first application client 122 does not require a low latency, the first application client 122 may perform data transmission and reception with the cloud server 3000. As another example, when the second application client 124 requires a low latency, the second application client 124 may perform MEC-based data transmission and reception with the edge data network 2000.

An application in the electronic device 1000 may be referred to as an application client, a client application (Client App), or a UE application (UE App). For convenience, hereinafter, in the disclosure, an application in the electronic device 1000 is referred to as an application client.

According to an embodiment of the disclosure, the AN 1100 may provide a channel for wireless communication with the electronic device 1000. The AN 1100 may refer to a radio access network (RAN), a base station, an evolved node B (eNodeB or eNB), a 5$^{th}$-generation (5G) node, a transmission/reception point (TRP), or a 5$^{th}$-generation NodeB (5GNB).

The edge data network 2000 may refer to a server which the electronic device 1000 accesses to use an MEC service. The edge data network 2000 may be provided at a location geographically close to the electronic device 1000, e.g., inside or around a base station. According to an embodiment of the disclosure, the edge data network 2000 may transmit and receive data to and from the electronic device 1000 without passing through an external data network (DN) (e.g., the Internet). MEC may stand for multi-access edge computing or mobile-edge computing.

The edge data network 2000 may be referred to as an MEC host, an edge computing server, a mobile edge host, an edge computing platform, an MEC server, or the like. For convenience, hereinafter, in the disclosure, the edge data network 2000 is referred to as an MEC server. Referring to FIG. 1, the edge data network 2000 may include a first edge application 142, a second edge application 144, and an edge enabler server (or an MEC platform (MEP)) 146. The edge enabler server 146 provides an MEC service, performs a traffic control, or the like in the edge data network 2000, and detailed descriptions of the edge enabler server 146 will be made below.

According to an embodiment of the disclosure, the edge data network 2000 may execute a plurality of applications. For example, the edge data network 2000 may execute the first edge application 142 and the second edge application 144. An edge application may refer to an application provided by a third party in an edge data network which provides an MEC service. An edge application may be used to establish a data session with an application client in order to transmit and receive data associated with the application client. An edge application may establish a data session with an application client. A data session may refer to a communication path established for an application client in the electronic device 1000 and an edge application in the edge data network 2000 to transmit and receive data to and from each other.

An application in the edge data network 2000 may be referred to as an MEC application (MEC App), an ME (MEC) App, an edge application server, or an edge application. For convenience, hereinafter, in the disclosure, an application in the edge data network 2000 is referred to as an edge application. Although the term 'application' is used in the present disclosure, the edge application may refer to an application server existing in the edge data network 2000.

According to an embodiment of the disclosure, the cloud server 3000 may provide content associated with an application. For example, the cloud server 3000 may be managed by a content provider. The cloud server 3000 may transmit and receive data to and from the electronic device 1000 via an external DN (e.g., the Internet).

Although not shown in FIG. 1, a core network (CN) and a DN may exist between the AN 1100 and the edge data network 2000. According to an embodiment of the disclosure, the DN may provide a service (e.g., an Internet service or an internet protocol multimedia subsystem (IMS) service) to the electronic device 1000 by transmitting and receiving data (or a data packet) to and from the electronic device 1000 via the CN and the AN 1100. For example, the DN may be managed by a network operator. According to an embodiment of the disclosure, the edge data network 2000 may be connected to the AN 1100 or the CN via the DN (e.g., a local DN).

According to an embodiment of the disclosure, when the first application client 122 or the second application client 124 is executed in the electronic device 1000, the electronic device 1000 may access the edge data network 2000 via the AN 1100 to transmit and receive data for executing an application client.

In the disclosure, a method of streaming video content among the electronic device 1000, the edge data network 2000, and the cloud server 3000 described above may be provided. A method of effectively providing content for VR, AR, or MR to a user based on the user's interaction information on a video reproduced by the electronic device 1000 is described. A method, performed by the edge data network 2000, of streaming video content based on orientation information and pupil position information of the video content reproduced by the electronic device 1000 is described below.

Figure 2:
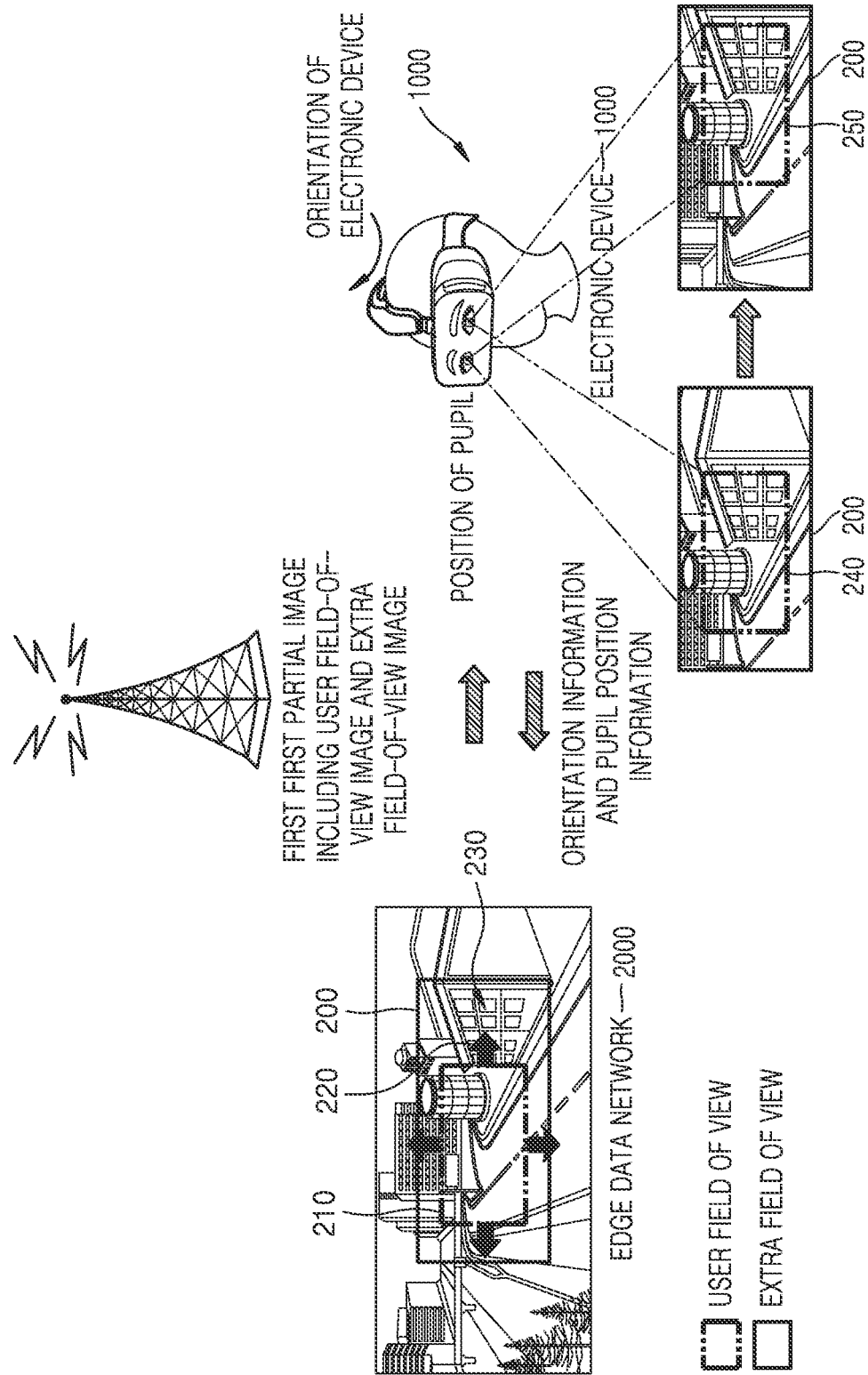
FIG. 2 is a diagram illustrating a method, performed by an edge data network, of adaptively streaming an extended field-of-view (FoV) image including an extra FoV image, considering orientation information and pupil position information, according to an embodiment of the disclosure.

FIG. 2 is a diagram illustrating a method, performed by an edge data network, of adaptively streaming an extended field-of-view (FoV) image including an extra FoV image, considering orientation information and pupil position information, according to an embodiment of the disclosure.

Referring to FIG. 2, the electronic device 1000 may sense the orientation information and the pupil position information, and may transmit, to the edge data network 2000, the orientation information and the pupil position information, periodically, upon a request from the edge data network 2000, or when a value included in the orientation information or the pupil position information is changed.

In this case, the orientation information may include angle values of a gaze of the user of the electronic device 1000, which are measured by using a sensing module of the electronic device 1000. For example, the electronic device 1000 may sense orientation information (e.g., roll, pitch, and yaw values) of a gaze of the user looking at a certain partial image in a VR image by using the sensing module (e.g., a three-axis tilt sensor), and the electronic device 1000 may transmit the sensed orientation information to the edge data network 2000, so as to share, with the edge data network 2000, information about at which portion of the VR image the user of the electronic device 1000 is currently looking.

The pupil position information may be information indicating a position of a pupil measured by using a camera module or a separate pupil position sensing module of the electronic device 1000. For example, when an area within which the pupil may be positioned is mapped to an N×M coordinate system, the pupil position information may be information indicating position coordinates of the pupil in the N×M coordinate system. In this case, reference coordinates (0,0) of the N×M coordinate system may be coordinates representing the lower-leftmost point of a quadrangular area within which the pupil may be positioned, but are not limited thereto, and may be coordinates representing the center of the quadrangular area, may be coordinates representing the upper-leftmost point of the quadrangular area, or may be other coordinates representing one of various positions. The electronic device 1000 may transmit the pupil position information to the edge data network 2000 to identify the current position of the pupil of the user of the electronic device, and predict in which direction the user is to subsequently look based on the identified position of the pupil, so as to identify an FoV of a first partial image corresponding to a result of the prediction. Here, the field of view refers to an extent which may be viewed by the user's eyes, which may be expressed as an angle, but is not limited thereto. In a case of an image having a wide FoV, a wider extent may be viewed by the user's eyes.

However, an extent which the user may view through a display of the electronic device 1000 may be limited to the size of a viewport area of the electronic device 1000. The size of the viewport area is the size of a FoV which may be reproduced on the display of the electronic device 1000 (the size of a display area), and the size of the viewport area may be identified according to capability information of the electronic device 1000. The size of the viewport area is one of hardware specifications of the display of the electronic device 1000, and the edge data network 2000 may receive the capability information of the electronic device 1000 from the electronic device 1000 via a network connection with the electronic device 1000, and identify the size of the viewport area of the electronic device 1000 according to the capability information.

For example, when the size of the viewport area of the electronic device 1000 in a horizontal direction is 110° and the size of the viewport area of the electronic device 1000 in a vertical direction is 90°, the electronic device 1000 may transmit the capability information of the electronic device 1000 including information about the size of the viewport area to the edge data network 2000 via a network connection, and the edge data network 2000 may identify that the size of the viewport area in the horizontal direction is 110° and the size of the viewport area in the vertical direction is 90° based on the capability information.

Accordingly, a user FoV (a default FoV) may refer to an extent which the user may view through the viewport area of the electronic device 1000. A user FoV image (a default FoV image) may be referred to as a FoV image. The user FoV may be identified based on the size of the viewport area of the electronic device 1000, and the edge data network 2000 may obtain the user FoV image in the VR image based on the orientation information and the identified user FoV.

When the orientation of the electronic device 1000 is changed according to the movement of the user's head over time, and thus the extent of an image viewed by the user is changed, the image of the existing user FoV is unable to provide the user with an intact image corresponding to the changed extent. An extra FoV may refer to a FoV which is obtained considering this situation (e.g., upper, lower, left, and right extra FoVs based on the user FoV).

The FoV of the first partial image encoded to be displayed on the electronic device 1000 may be an extended FoV including the user FoV (the default FoV) and the extra FoV. The first partial image may be a FoV image including the user FoV image (the default FoV image) and the extra FoV image. The FoV image including the user FoV image and the extra FoV image may be referred to as an extended FoV image.

The edge data network 2000 may obtain a first partial image 200 including a user FoV image 210 corresponding to the orientation information received from the electronic device 1000 and an extra FoV image 230 corresponding to the pupil position information.

In this case, the extra FoV image 230 may be obtained together with the user FoV image 210 by identifying an FoV 220 in a direction corresponding to the direction of the pupil to be larger than FoVs in other directions considering the direction of the pupil indicated by the position of the pupil, based on the identified FoV.

In this case, the user FoV (the default FoV) may be identified based on information about the viewport area of the electronic device 1000 described above, and the user FoV image 210 may be part of the VR image obtained based on the user FoV (e.g., 110°) based on orientation coordinates indicated by the orientation information (e.g., roll, pitch, and yaw values).

The edge data network 2000 may encode the first partial image to generate a first frame. The edge data network 2000 may transmit the first frame to the electronic device 1000. The electronic device 1000 may obtain the first partial image by decoding the first frame received from the edge data network 2000, and the electronic device 1000 may obtain a first user FoV image 240 in the first partial image based on latest orientation information obtained from the sensing module and display the first user FoV image 240 on the display of the electronic device 1000. The orientation information of the electronic device 1000 may be changed due to a head movement of the user wearing the electronic device 1000. The electronic device 1000 may receive a new second frame by transmitting the changed orientation information to the edge data network 2000.

Before receiving the second frame based on the changed orientation information, the edge data network 2000 may obtain a second user FoV image 250 from the first partial image 200 obtained from the first frame, based on the latest orientation information obtained from the sensing module. Accordingly, even when a motion-to-photon latency (MTP latency) to a time point at which the second frame is received increases, the edge data network 2000 may prevent the user from seeing a black edge by performing local processing based on the extra FoV image, so as to achieve a sufficient offset for the period of time required for receiving the second frame, thereby substantially compensating for the MTP latency. The MTP latency may refer to a period of time during which the edge data network 2000 identifies a movement of the user (e.g., a movement of the gaze of the user) based on sensor information (e.g., orientation information) obtained through the sensing module of the electronic device 1000 and transmitted to the edge data network 2000, the edge data network 2000 provides a frame of a partial image in the VR image based on the sensor information, and the electronic device 1000 performed decoding and rendering on the provided frame of the partial image and then displays the rendered frame on the display.

Figure 3:
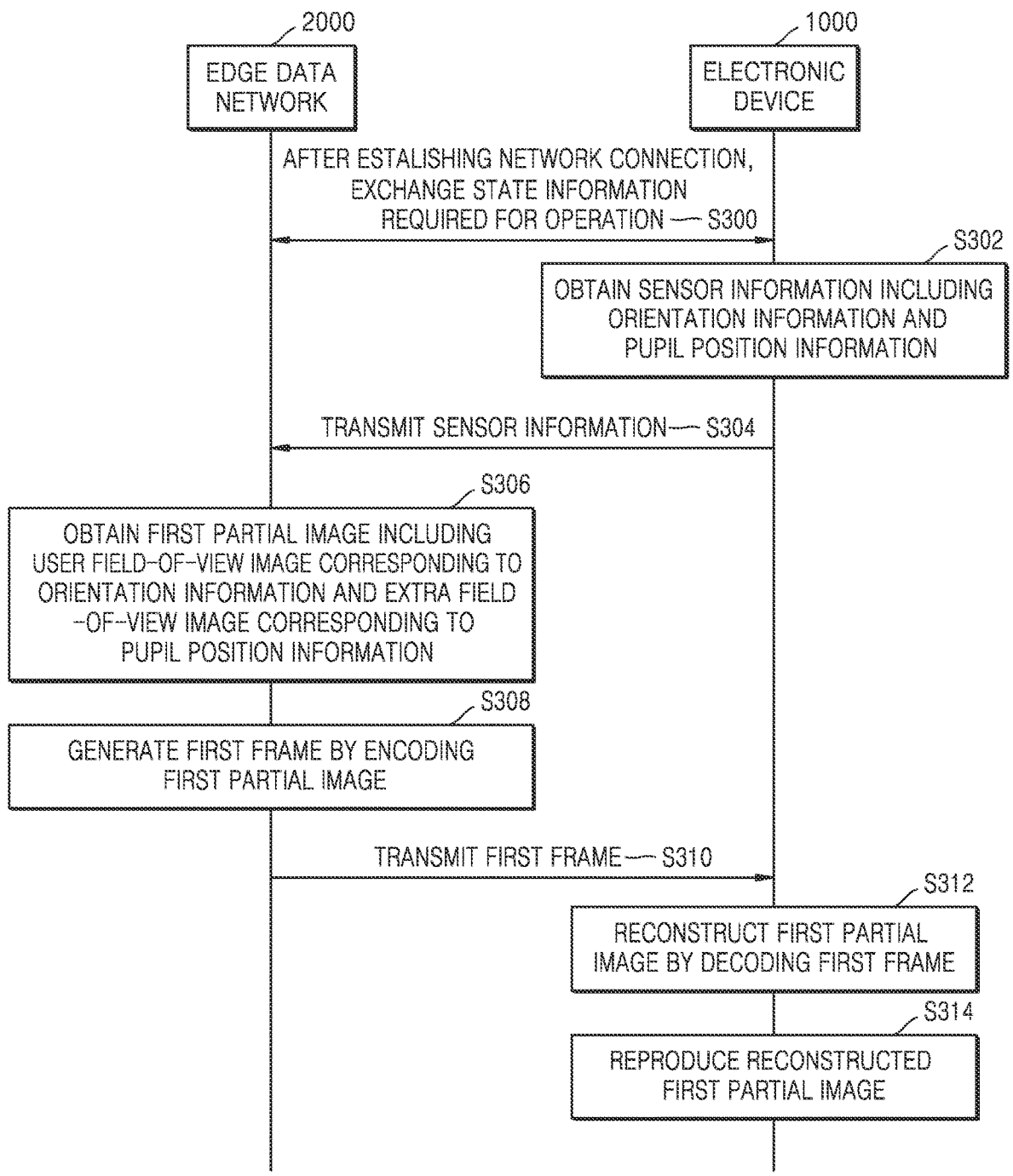
FIG. 3 is a flowchart illustrating a procedure of operation between an electronic device and an edge data network, according to an embodiment of the disclosure.

FIG. 3 is a flowchart illustrating an operation procedure between an electronic device and an edge data network, according to an embodiment of the disclosure.

Referring to FIG. 3, in operation S300, the edge data network 2000 may establish a network connection with the electronic device 1000, and may share, with the electronic device 1000, state information required for operations of the edge data network 2000 and the electronic device 1000. In this case, the state information may be shared only initially, periodically, or aperiodically only upon reception of a request or upon the occurrence of a change in the state information.

For example, the edge data network 2000 may receive, from the electronic device 1000, the capability information of the electronic device 1000. For example, the capability information may be information indicating operation-related capability of the electronic device 1000, e.g., information about the size of the viewport area of the electronic device 1000. The capability information may include information about whether the electronic device 1000 has a pupil position sensing function (e.g., a camera module or a separate pupil position sensing module). For example, the information about whether the electronic device 1000 has a pupil position sensing function may include information about whether the electronic device 1000 supports the pupil position sensing function by using a camera module or whether the electronic device 1000 includes a separate pupil position sensing module.

When the edge data network 2000 identifies that the electronic device 1000 does not have any pupil position sensing function based on the capability information, the edge data network 2000 may not perform an operation based on the pupil position information. When the edge data network 2000 identifies that the electronic device 1000 has a pupil position sensing function based on the capability information, the edge data network 2000 may perform the following operations. In operation S302, the electronic device 1000 may obtain sensor information including orientation information and pupil position information. The orientation information may be information indicating an angle component, and the pupil position information may be information including coordinates representing the position of a pupil in a predefined coordinate system. In operation S304, the electronic device 1000 may transmit, to the edge data network 2000, the sensor information including the orientation information and the pupil position information. The electronic device 1000 may periodically transmit the sensor information to the edge data network 2000, but is not limited thereto, and may aperiodically transmit the sensor information to the edge data network 2000. For example, the electronic device 1000 may transmit the sensor information only upon a request from the edge data network 2000 or upon the occurrence of a change in values of the sensor information. In operation S306, the edge data network 2000 may obtain the first partial image including the user FoV image corresponding to the orientation information and the extra FoV image corresponding to the pupil position information. The user FoV image may be an image having a user FoV identified based on information about the viewport area of the display of the electronic device 1000, based on a position in the VR image indicated by the orientation information. The first partial image may be a partial image in a first VR image having a predetermined frame index of a VR sequence including a plurality of frames, and the first partial image may be related to the orientation information indicating a position of the partial image.

The edge data network 2000 may identify an extra FoV based on the coordinates of a position of the pupil with respect to a reference point that are indicated by the pupil position information, and may obtain an image having the identified extra FoV. The extra FoV image may be an image having an extra FoV in at least one of up, down, left, and right directions based on the user FoV image.

The edge data network 2000 may identify the extra FoV based on a pupil direction and a pupil distance identified from the coordinates of the center and the coordinates of the position of the pupil in a user eye entire area (the area within which the pupil of the user may be positioned), and may obtain the image having the identified extra FoV. In this case, the pupil direction may refer to a direction in which the coordinates of the position of the pupil are present based on the coordinates of the center, and the pupil distance may refer to a distance between the coordinates of the center and the coordinates of the position of the pupil. Based on the user FoV, an extra FoV in a direction corresponding to the pupil direction may be larger than a FoV in the opposite direction.

The edge data network 2000 may identify an extra FoV corresponding to at least one of the horizontal component or the vertical component of the coordinates of the position of the pupil with respect to at least one of the width or the height of the user eye entire area.

The edge data network 2000 may obtain the image having the identified extra FoV. In this case, left and right first extra FoVs corresponding to the horizontal component of the position of the pupil and upper and lower second extra FoVs corresponding to the vertical component of the position of the pupil may be identified, and the extra FoV image may be an image having the identified left and right first extra FoVs and the identified upper and lower second extra FoVs. The left or right extra FoV of the first extra FoVs may be greater than or equal to a first minimum FoV, and the upper or lower extra FoV of the second extra FoVs may be greater than or equal to a second minimum FoV. Here, the first minimum FoV and the second minimum FoV may be preset.

According to an embodiment of the disclosure, the extra FoV image corresponding to the position of the pupil may be an image having the extra FoV identified based on at least one of a period of time during which the pupil stays in a predetermined area, or a speed of movement of the pupil. This will be described with reference to FIG. 10. The extra FoV image corresponding to the pupil position information may be an image having an extra FoV identified based on a ratio of a pupil position l1 when the pupil position over time is a local maximum or a local minimum to an electronic device position l2 when the position of the electronic device over time is a local maximum or a local minimum. For example, the extra FoV when l2/l1 is greater than a first preset value may be greater than the extra FoV when l2/l1 is less than the first preset value. This will be described with reference to FIG. 12. The extra FoV image corresponding to the pupil position information may be an image having a FoV identified based on a FoV weight of a predetermined direction based on the position of the pupil and a displacement direction of the electronic device 1000. For example, when the current position of the pupil with respect to the center of the eye is opposite to the displacement direction (e.g., the direction of an instantaneous movement of the pupil), an FoV weight of a direction corresponding to the position of the pupil with respect to the center of the eye may be decreased, and when the current position of the pupil with respect to the center of the eye is in the displacement direction, the FoV weight of the direction corresponding to the position of the pupil with respect to the center of the eye may be increased. This will be described with reference to FIG. 12. According to an embodiment of the disclosure, the extra FoV image corresponding to the pupil position information may be an image having an extra FoV identified based on a difference between a point of time t1 at which the position of the pupil over time is a local maximum or a local minimum, and a point of time t2 at which the position of the electronic device over time is a local maximum or a local minimum. For example, the extra FoV image may have a larger extra FoV as the difference between t1 and t2 decreases, and may have a smaller extra FoV as the difference between t1 and t2 increases. This will be described with reference to FIG. 12. According to an embodiment of the disclosure, based on information about the type of video content related to the first partial image received by the electronic device 1000, an extension weight of the extra FoV and a sensitivity of a sensor (e.g., a three-axis tilt sensor, a camera sensor) included in the electronic device may be identified, and information about the extension weight of the extra FoV and the sensitivity of the sensor may be transmitted to the electronic device 1000. The edge data network 2000 may identify an extended extra FoV based on the extension weight of the extra FoV. This will be described with reference to FIG. 13.

In operation S308, the edge data network 2000 may generate the first frame by encoding the first partial image. In this case, the first partial image may be composed of data units of at least one preset FoV range. The edge data network 2000 may encode at least one first data unit corresponding to the user FoV image in the first partial image and at least one second data unit corresponding to the extra FoV image in the first partial image, and generate the first frame including the encoded first data unit and the encoded second data unit. A data unit of a preset FoV range will be described with reference to FIG. 14.

In operation S310, the edge data network 2000 may transmit the first frame to the electronic device 1000. In operation S312, the electronic device 1000 may receive the first frame from the edge data network 2000, and reconstruct the first partial image by decoding the first frame. In this case, the reconstructed first partial image may include the user FoV image and the extra FoV image.

In operation S314, the electronic device 1000 may reproduce the reconstructed first partial image. In this case, a partial image of the reconstructed first partial image may be obtained based on orientation information at the point of time of the reproduction, and the obtained partial image may be reproduced.

Figure 4:
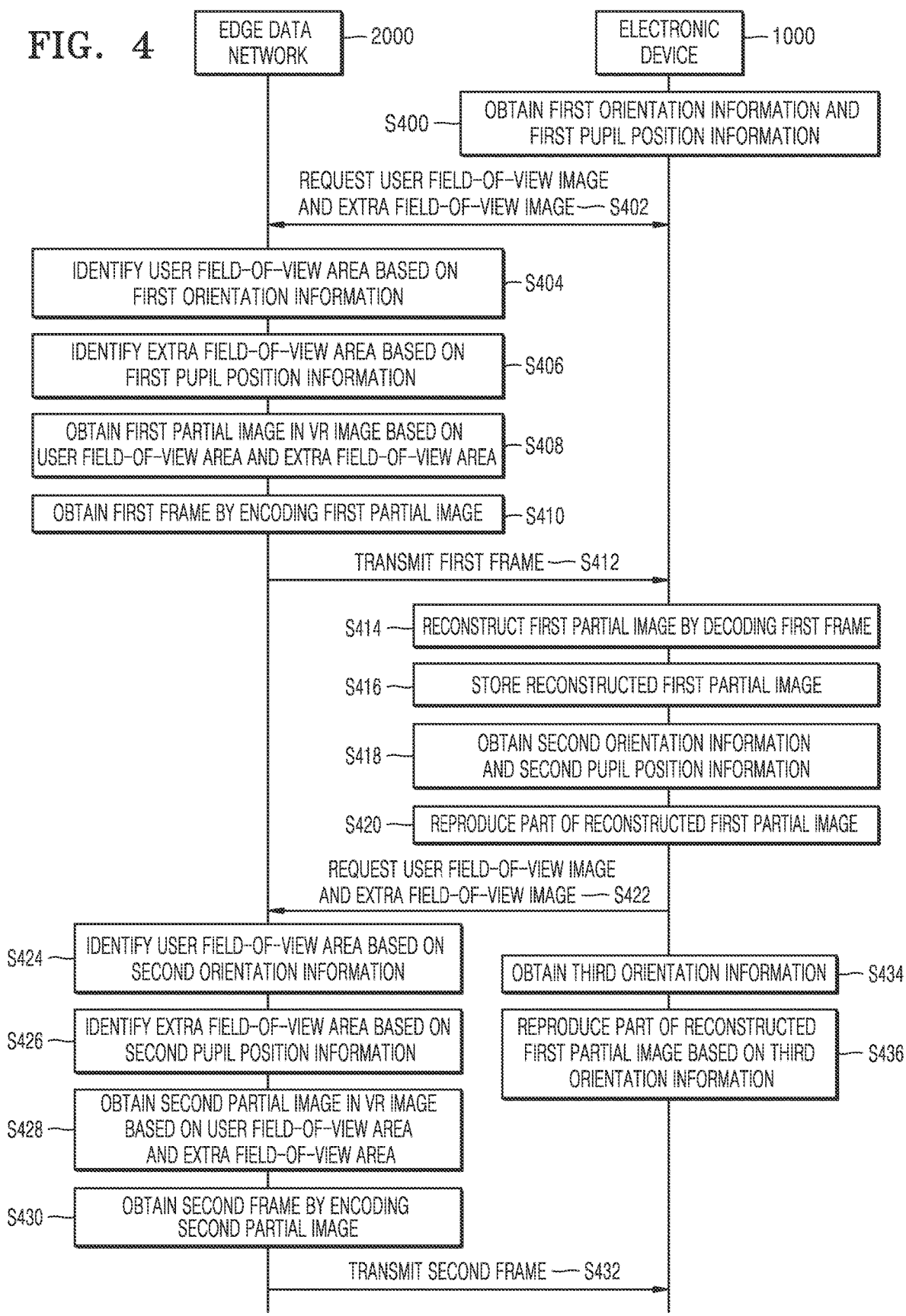
FIG. 4 is a flowchart illustrating a procedure of operation between an electronic device and an edge data network, according to an embodiment of the disclosure.

FIG. 4 is a flowchart illustrating an operation procedure between an electronic device and an edge data network, according to an embodiment of the disclosure.

Referring to FIG. 4, in operation S400, the electronic device 1000 may obtain the orientation information and the pupil position information.

In operation S400, the electronic device 1000 may obtain first orientation information and first pupil position information by using the sensing module. The electronic device 1000 may obtain the orientation information by using a three-axis tilt sensor. The electronic device 1000 may obtain the pupil position information by using a camera module or a separate pupil position sensing module.

In operation S402, the electronic device 1000 may request the edge data network 2000 to transmit the first partial image including the user FoV image and the extra FoV image based on the first orientation information and the first pupil position information. The electronic device 1000 may transmit a first partial image request message including the first orientation information and the first pupil position information to the edge data network 2000.

In operation S404, the edge data network 2000 may identify a user FoV area in a VR area based on the first orientation information (and viewport area information of the electronic device 1000) received from the electronic device 1000. For example, the user FoV area having a horizontal FoV (e.g., 110°) according to the viewport area information may be identified by using an orientation (e.g., roll, pitch, and yaw values) indicated by the orientation information as a reference orientation (e.g., a center orientation).

In operation S406, the edge data network 2000 may identify an extra FoV area based on the first pupil position information. In this case, based on a direction in which the position of the pupil is biased, a left or right extra FoV area and an upper or lower extra FoV area may be identified. For example, based on the user FoV area, the edge data network 2000 may identify the left extra FoV (e.g., x°) area of the user FoV area, the right extra FoV (e.g., y°) area of the user FoV area, the upper extra FoV (e.g., z°) area of the user FoV area, and the lower FoV (e.g., w°) area of the user FoV area.

In operation S408, based on the user FoV area and the extra FoV area, the edge data network 2000 may obtain the first partial image including the user FoV image and the extra FoV image in the VR image. In this case, the edge data network 2000 may crop only part of the user FoV area and an extra FoV area in the VR image, based on the orientation indicated by the orientation information.

In operation S410, the edge data network 2000 may obtain the first frame by encoding the first partial image.

In operation S412, the edge data network 2000 may transmit the first frame to the electronic device 1000.

In operation S414, the electronic device 1000 may reconstruct the first partial image by decoding the first frame.

In operation S416, the electronic device 1000 may store the reconstructed first partial image.

In operation S418, the electronic device 1000 may obtain second orientation information and second pupil position information.

In operation S420, the electronic device 1000 may reproduce part of the reconstructed first partial image based on the second orientation information. For example, the electronic device 1000 may perform warping and rendering on a user FoV image corresponding to the second orientation information in the reconstructed first partial image, and then display the user FoV image on the display of the electronic device 1000.

In operation S422, the electronic device 1000 may request the edge data network 2000 to transmit a second partial image including the user FoV image and an extra FoV image, based on the second orientation information and the second pupil position information. The electronic device 1000 may transmit a second partial image request message including the second orientation information and the second pupil position information to the edge data network 2000.

In operation S424, the edge data network 2000 may identify the user FoV area based on the second orientation information.

In operation S426, the edge data network 2000 may identify the extra FoV area based on the second pupil position information.

In operation S428, the edge data network 2000 may obtain the second partial image including the user FoV image and the extra FoV image in the VR image, based on the user FoV area and the extra FoV area which are identified based on the second orientation information and the second pupil position information.

In operation S430, the edge data network 2000 may obtain the second frame by encoding the second partial image.

In operation S432, the edge data network 2000 may transmit the second frame to the electronic device 1000.

In operations S434 and S436, the electronic device 1000 may obtain third orientation information in a period of time after requesting the user FoV image and the extra FoV image and before receiving the second frame, and may reproduce part of the reconstructed first partial image based on the third orientation information.

In this case, a period of time after obtaining the second orientation information and before receiving and reproducing the second frame may be defined as the MTP latency. When the MTP latency is low enough to be unrecognizable by the user (e.g., when the MTP latency is less than or equal to 20 ms), the user may feel that the image is smoothly reproduced. Alternatively, when the MTP latency is slightly high, but a user FoV image corresponding to current orientation information is available to be reproduced from an existing reconstructed partial image including an extra FoV, the user may feel that the image is smoothly reproduced, without seeing a black dummy Therefore, by predicting the direction in which the user wearing the electronic device is to move his/her head so as to secure a sufficient FoV, the MTP latency may be compensated for. In order to predict the direction in which the user is to move his/her head (i.e., a change in the orientation information of the electronic device), the pupil position information may be obtained together with the orientation information considering that a movement of the pupil precedes the movement of the user's head, and the edge data network 2000 may identify the extra FoV corresponding to the pupil position information and transmit a frame including the extra FoV image, such that the electronic device 1000 may reproduce an image based on the previously received extra FoV image until the frame according to the next movement of the electronic device is received, thus, the user may feel that the image is being smoothly reproduced without a delay, and accordingly, the MTP latency may be compensated for. That is, tolerance to a processing delay of the network and the edge data network 2000 may be achieved.

In addition, the edge data network 2000 may sufficiently identify an extra FoV in an appropriate direction considering a pupil direction of the pupil position information, and minimize extra FoVs in other directions, thereby compensating for the MTP latency and effectively transmitting an image while minimizing a waste of bandwidth.

Figure 5:
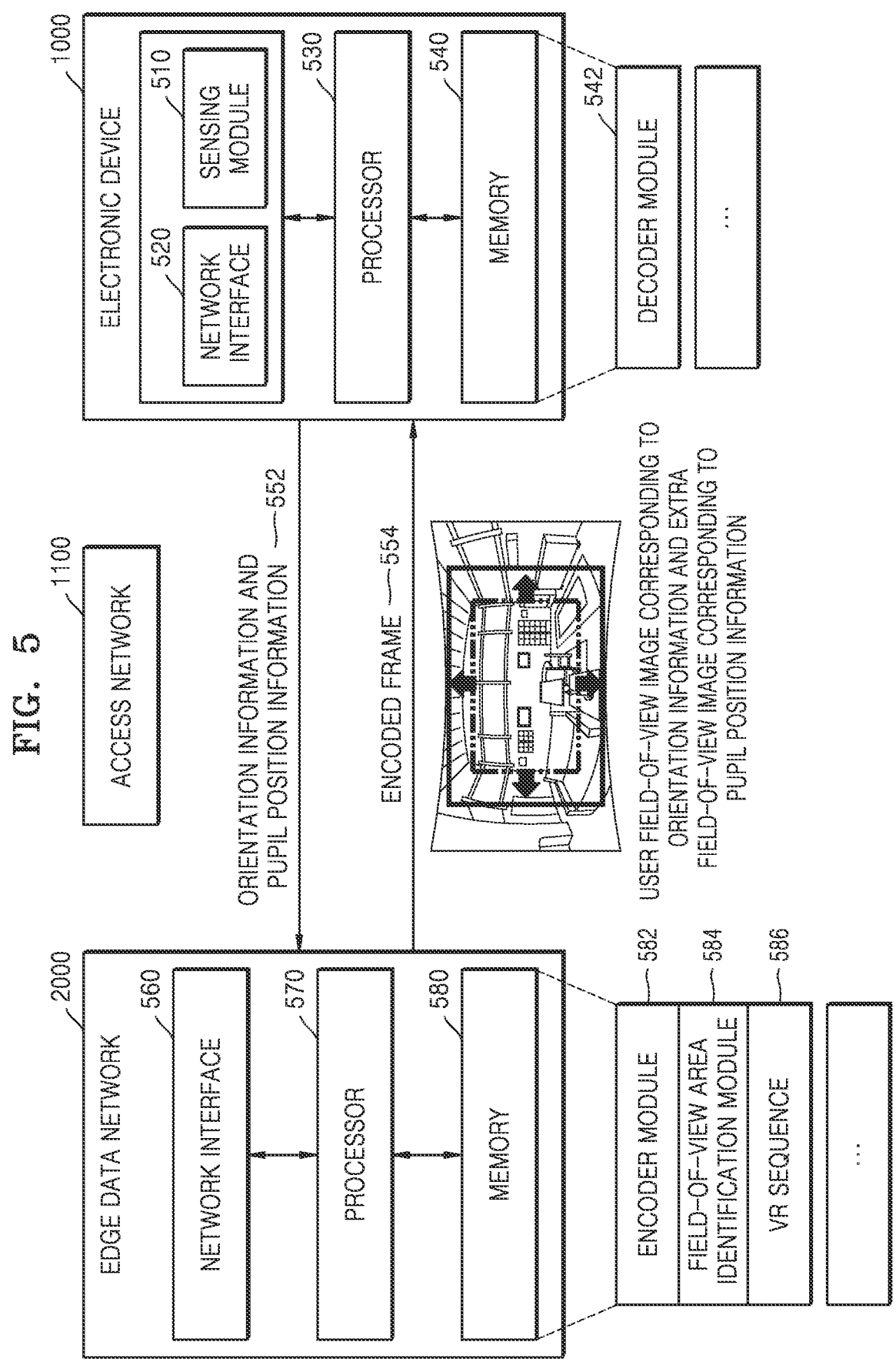
FIG. 5 is a diagram schematically illustrating a procedure of operation between an electronic device and an edge data network according to an embodiment of the disclosure.

FIG. 5 is a diagram schematically illustrating an operation procedure between an electronic device and an edge data network according to an embodiment of the disclosure.

Referring to FIG. 5, the electronic device 1000 may include a sensing module 510, a network interface 520, a processor 530, and a memory 540. However, components in the electronic device 1000 are not limited thereto, and the electronic device 1000 may include more or fewer components.

The electronic device 1000 may decode images received from the edge data network 2000 or the cloud server 3000, and display images obtained as a result of the decoding, on the display of the electronic device. Also, the electronic device 1000 may obtain sensor information including orientation information and pupil position information with respect to the reproduced images by using the sensing module 510.

The electronic device 1000 may transmit the sensor information including the orientation information and the pupil position information to the edge data network 2000 by using the network interface 520. In this case, the electronic device 1000 may transmit, to the edge data network 2000, frame index information obtained when the orientation information and the pupil position information are sensed. However, the disclosure is not limited thereto, and reference frame information among reconstructed frames may be transmitted to the edge data network 2000 before the orientation information and the pupil position information are sensed. The frame index may be information indicating an encoding/decoding order of a frame, but is not limited thereto, and the frame index may be information indicating a rendering order of the frame.

The processor 530 controls a general operation of the electronic device 1000 by executing one or more instructions in the memory 540. For example, the processor 530 may control the sensing module 510 and the network interface 520 by executing the one or more instructions stored in the memory 540. According to an embodiment of the disclosure, the processor 530 may obtain a first partial image including a user FoV image corresponding to the orientation information and an extra FoV image corresponding to the pupil position information, and may generate a first frame by encoding the first partial image. In this case, the first frame may be an intra-coded frame (I frame) or a predictive-coded frame (P frame) (or a bidirectional predicted frame (B-frame)).

In addition, according to an embodiment of the disclosure, the processor 530 may receive an encoded frame 554 from the edge data network 2000, and may reconstruct the first partial image by decoding the first partial image based on the encoded frame. The processor 530 may obtain orientation information at a point of time of reproduction, and may reproduce part of the reconstructed first partial image based on the obtained orientation information.

According to an embodiment of the disclosure, the memory 540 may include a decoder module 542 storing instructions for decoding encoded frames received from the edge data network 2000, but is not limited thereto.

According to an embodiment of the disclosure, the edge data network 2000 may include a network interface 560, a processor 570, and a memory 580. However, components of the edge data network 2000 are not limited thereto, and the edge data network 2000 may include a number of components, or some components may be omitted therefrom.

The edge data network 2000 may obtain the sensor information including the orientation information and the pupil position information 552 from the electronic device 1000 by using the network interface 560, and transmit a frame encoded by the edge data network 2000 based on the sensor information and the like to the electronic device.

The processor 570 controls a general operation of the edge data network 2000 by executing one or more instructions in the memory 580.

For example, the processor 570 may obtain the first partial image including the user FoV image corresponding to the orientation information and the extra FoV image corresponding to the pupil position information. The processor 570 may generate the first frame by encoding the first partial image. This is described above with respect to FIG. 4, and thus a detailed description thereof is omitted.

The processor 570 may transmit the first frame to the electronic device 1000.

According to an embodiment of the disclosure, the memory 580 may include an encoder module 582 storing instructions for encoding images to be transmitted from the edge data network 2000 to the electronic device 1000, and a FoV area identification module 584, and may store a VR sequence 586 including entire image data for a VR sequence, but is not limited thereto.

For example, the edge data network 2000 may store the VR sequence including all frames in a database (DB). The edge data network 2000 may identify the user FoV image in the VR sequence stored in the DB by using the orientation information obtained from the electronic device 1000.

Figure 6:
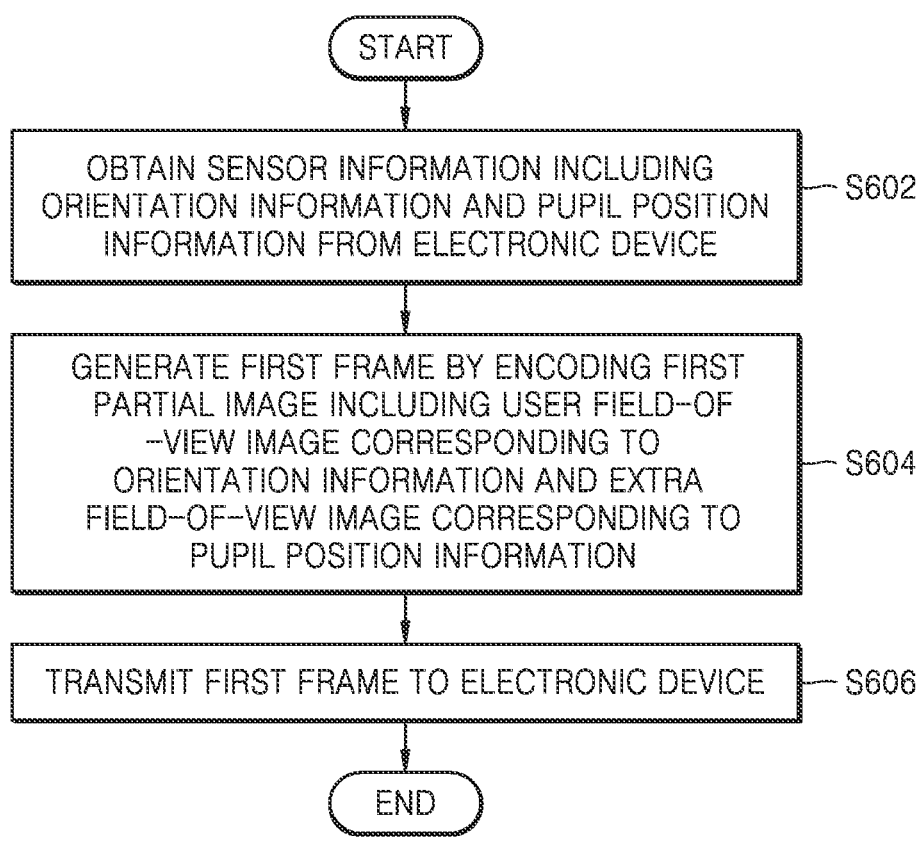
FIG. 6 is a flowchart illustrating a method, performed by an edge data network, of streaming video content, according to an embodiment of the disclosure.

FIG. 6 is a flowchart illustrating a method, performed by an edge data network, of streaming video content, according to an embodiment of the disclosure.

Referring to FIG. 6, in operation S602, the edge data network 2000 may obtain sensor information including orientation information and pupil position information from the electronic device 1000.

In operation S604, the edge data network 2000 may generate a first frame by encoding a first partial image including a user FoV image corresponding to the orientation information and an extra FoV image corresponding to the pupil position information. This is described above with reference to FIGS. 3 and 4.

In operation S606, the edge data network 2000 may transmit the first frame to the electronic device 1000.

Figure 7:
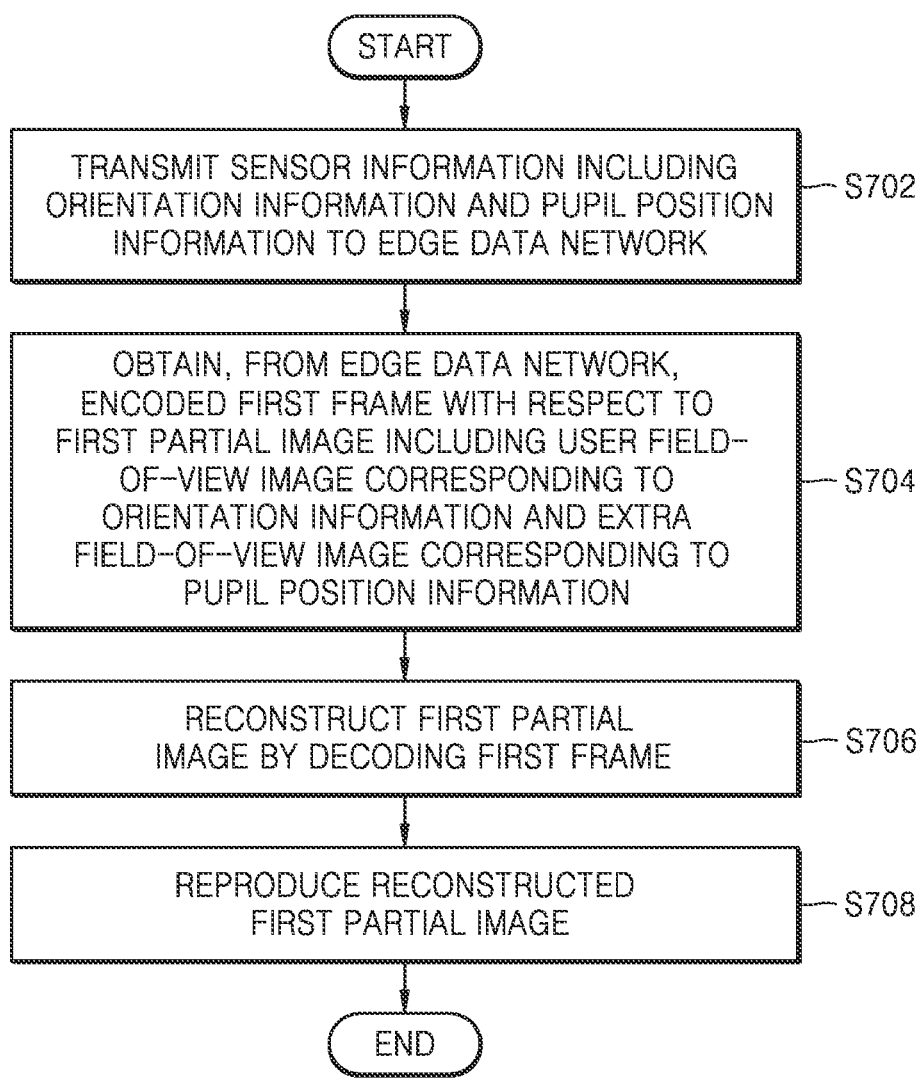
FIG. 7 is a flowchart illustrating a method, performed by an electronic device, of streaming video content obtained from an edge data network, according to an embodiment of the disclosure.

FIG. 7 is a flowchart illustrating a method, performed by an electronic device, of streaming video content obtained from an edge data network, according to an embodiment of the disclosure.

Referring to FIG. 7, in operation S702, the electronic device 1000 may transmit sensor information including orientation information and pupil position information to the edge data network 2000.

In operation S704, the electronic device 1000 may obtain an encoded first frame with respect to a first partial image including a user FoV image corresponding to the orientation information and an extra FoV image corresponding to the pupil position information, from the edge data network 2000. The operation performed by the edge data network

2000 of generating the first frame by encoding the first partial image including the user FoV image corresponding the orientation information and the extra FoV image corresponding to the pupil position information is described above, and thus a detailed description thereof is omitted.

In operation S706, the electronic device 1000 may reconstruct the first partial image by decoding the first frame.

In operation S708, the electronic device 1000 may reproduce the reconstructed first partial image. In this case, the electronic device 1000 may reproduce part of the reconstructed first partial image based on the orientation information at the point of time of the reproduction.

Figure 8A:
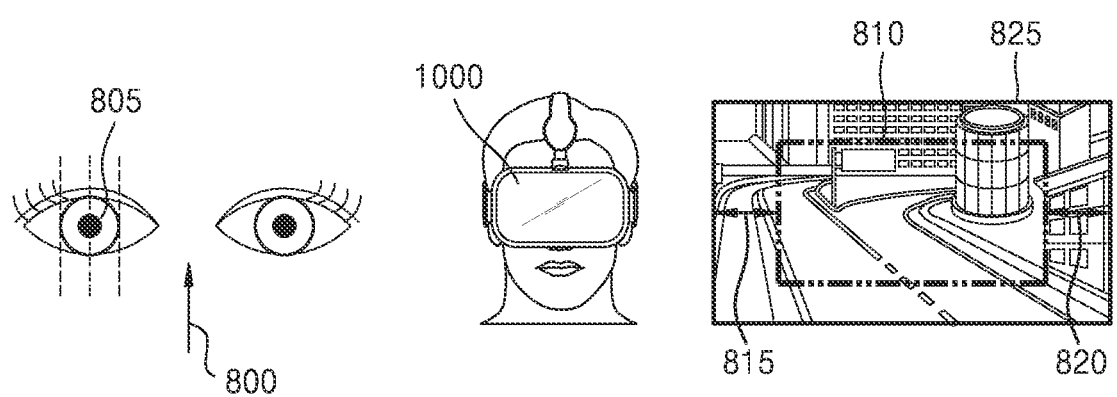
FIG. 8A is a diagram illustrating a process, performed by an edge data network, of streaming a first partial image when a pupil is at the center, according to an embodiment of the disclosure.

FIG. 8A is a diagram illustrating a process, performed by an edge data network, of streaming a first partial image when a pupil is at the center, according to an embodiment of the disclosure.

Referring to FIG. 8A, when the electronic device 1000 identifies that the pupil 805 is at the center of the eye based on an eye-facing direction 800, the edge data network 2000 may identify that the user is maintaining his/her gaze without rotating his/her head (i.e., the electronic device 1000) based on pupil position information of the electronic device 1000. The edge data network 2000 may obtain, from a VR image, an extended FoV image 825 including a user FoV image 810 corresponding to orientation information transmitted from the electronic device 1000 and an image of a left extra FoV 815 and an image of a right extra FoV 820, which have the same size and correspond to the position of the pupil 805, encode the extended FoV image 825, and transmit the encoded result to the electronic device 1000. When the electronic device 1000 is moved by an extent within the left extra FoV 815 and the right extra FoV 820 during a period of time after requesting the partial image and before receiving the partial image based on the orientation information, the electronic device 1000 may display the user FoV image without a delay based on the partial image reconstructed by the electronic device 1000.

Figure 8B:
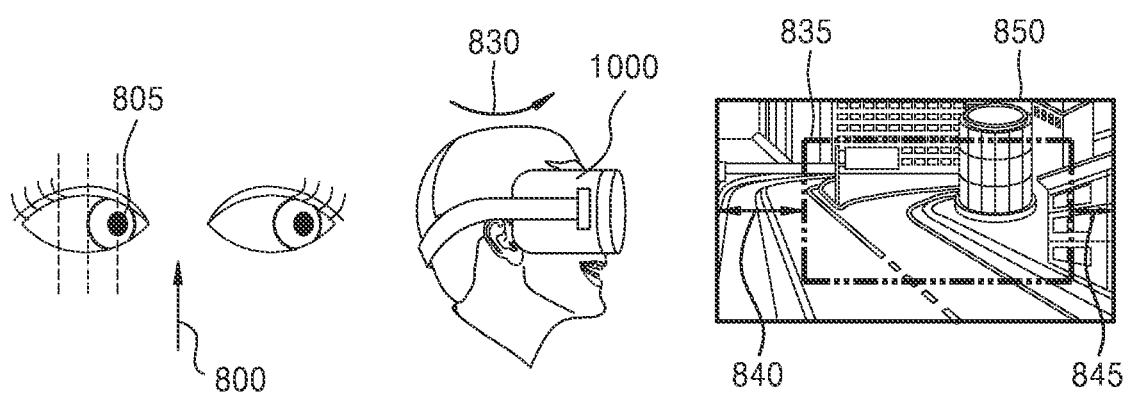
FIG. 8B is a diagram illustrating a process, performed by an edge data network, of streaming a first partial image when the position of a pupil is completely biased to the right based on an eye-facing direction, according to an embodiment of the disclosure.

FIG. 8B is a diagram illustrating a process, performed by an edge data network 2000, of streaming a first partial image when the position of a pupil is completely biased to the right based on the eye-facing direction, according to an embodiment of the disclosure.

Referring to FIG. 8B, when the electronic device 1000 identifies that the pupil 805 is completely biased to the right of the eye based on the eye-facing direction 800, the edge data network 2000 may identify that the electronic device 1000 is highly likely to be rotated in a counterclockwise direction 830, based on the pupil position information of the electronic device 1000.

The edge data network 2000 may obtain, from a VR image, an extended FoV image 850 including a user FoV image 835 corresponding to the orientation information transmitted from the electronic device 1000, an image of a left extra FoV 840 and an image of a right extra FoV 845 which correspond to the position of the pupil 805, encode the extended FoV image 850, and transmit the encoded result to the electronic device 1000. In this case, the left extra FoV 840 may be identified to be larger than the right extra FoV 845.

When the electronic device 1000 is moved by an extent within the left extra FoV 840 and the right extra FoV 845 during a period of time after requesting a partial image and before receiving the partial image based on the orientation information, the electronic device 1000 may display the user FoV image without a delay based on the partial image reconstructed by the electronic device 1000. In particular, the edge data network 2000 may predict a rotation direction after a point of time of requesting the partial image considering the position of the pupil 805 to secure a wider FoV in the corresponding direction (the left direction), and thus, the electronic device 1000 may display a user FoV image without a delay based on a partial image including an extra FoV considering the position of the pupil 805.

Figure 8C:
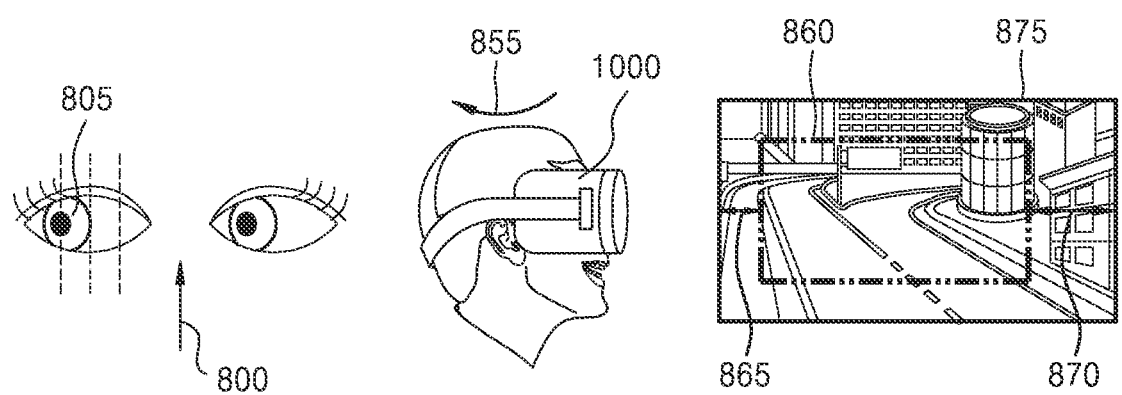
FIG. 8C is a diagram illustrating a process, performed by an edge data network, of streaming a first partial image when the position of a pupil is completely biased to the left based on an eye-facing direction, according to an embodiment of the disclosure.

FIG. 8C is a diagram illustrating a process, performed by an edge data network 2000, of streaming a first partial image when the position of the pupil is completely biased to the left based on the eye-facing direction, according to an embodiment of the disclosure.

Referring to FIG. 8C, when the electronic device 1000 identifies that the pupil 805 is completely biased to the left of the eye based on the eye-facing direction 800, the edge data network 2000 may identify that the electronic device 1000 is highly likely to be rotated in a clockwise direction 855, based on the pupil position information of the electronic device 1000.

The edge data network 2000 may obtain, from a VR image, an extended FoV image 875 including a user FoV image 860 corresponding to the orientation information transmitted from the electronic device 1000, an image of a left extra FoV 865 and an image of a right extra FoV 870 which correspond to the position of the pupil 805, encode the extended FoV image 875, and transmit the encoded result to the electronic device 1000. In this case, the right extra FoV 870 may be identified to be larger than the left extra FoV 865.

When the electronic device 1000 is moved by an extent within the left extra FoV 865 and the right extra FoV 870 during a period of time after requesting a partial image and before receiving the partial image based on the orientation information, the electronic device 1000 may display the user FoV image without a delay based on the partial image reconstructed by the electronic device 1000. In particular, the edge data network 2000 may predict a rotation direction after a point of time of requesting the partial image considering the position of the pupil 805 to secure a wider FoV in the corresponding direction (the right direction), and thus, the electronic device 1000 may display a user FoV image without a delay based on a partial image including an extra FoV considering the position of the pupil 805.

Figure 8D:
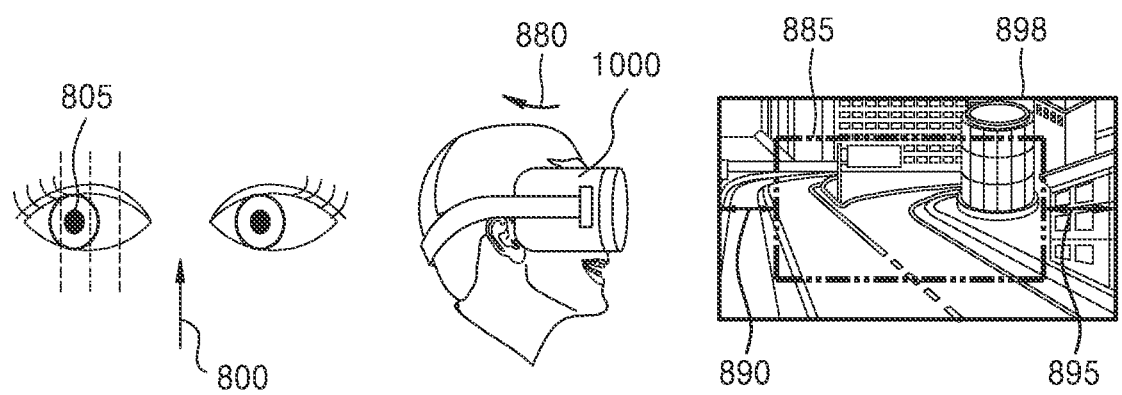
FIG. 8D is a diagram illustrating a process, performed by an edge data network, of streaming a first partial image when the position of a pupil is slightly biased to the left based on an eye-facing direction, according to an embodiment of the disclosure.

FIG. 8D is a diagram illustrating a process, performed by the edge data network, of streaming a first partial image when the position of the pupil is slightly biased to the left based on the eye-facing direction, according to an embodiment of the disclosure.

Referring to FIG. 8D, when the electronic device 1000 identifies that the pupil 805 is slightly biased to the left of the eye based on the eye-facing direction 800, the edge data network 2000 may identify that the electronic device 1000 is highly likely to be rotated in a clockwise direction 880 but is also slightly likely to be rotated in the counterclockwise direction, based on the pupil position information of the electronic device 1000.

The edge data network 2000 may obtain, from a VR image, an extended FoV image 898 including a user FoV image 885 corresponding to the orientation information transmitted from the electronic device 1000, an image of a left extra FoV 890 and an image of a right extra FoV 895, encode the extended FoV image 898, and transmit the encoded result to the electronic device 1000. In this case, the right extra FoV 895 may be identified to be larger than the left extra FoV 890, and the left extra FoV 890 may be identified to be larger than a minimum FoV.

When the electronic device 1000 is moved by an extent within the left extra FoV 890 and the right extra FoV 895 during a period of time after requesting a partial image and before receiving the partial image based on the orientation information, the electronic device 1000 may display the user FoV image without a delay based on the partial image reconstructed by the electronic device 1000. In particular, the edge data network 2000 may predict a rotation direction after a point of time of requesting the partial image considering the position of the pupil 805 to secure a wider FoV in the corresponding direction (the right direction) and an FoV in the opposite direction (the left direction) wider than the minimum FoV, and thus, the electronic device 1000 may display a user FoV image without a delay based on a partial image including an extra FoV considering the position of the pupil 805.

Figure 9:
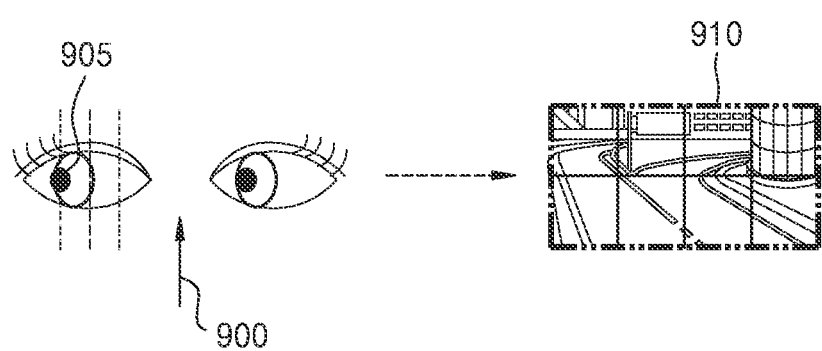
FIG. 9 is a diagram illustrating a process, performed by an edge data network, of mapping an area of positions of a pupil to an area in a user FoV image and identifying an extra FoV image based on a mapped screen area, according to an embodiment of the disclosure.

FIG. 9 is a diagram illustrating a process, performed by the edge data network, of mapping an area of positions of a pupil to an area in a user FoV image and identifying an extra FoV image based on a mapped screen area, according to an embodiment of the disclosure.

Referring to FIG. 9, the edge data network 2000 may divide an area within which the pupil 905 may be positioned into sub-areas, and identify at which sub-area of the area the pupil 905 is positioned, for identifying the position of the pupil 905 based on an eye-facing direction 900, based on position information of the pupil 905. The edge data network 2000 may map the identified sub-area to an area in the user FoV image 910. For example, the edge data network 2000 may divide the area within which the pupil 905 may be positioned into sub-areas into eight sub-areas, and may divide the user FoV image 910 into eight areas. In this case, the sub-area of the position of the pupil and the area in the user FoV image 910 mapped thereto may be horizontally symmetrical to each other with respect to the coordinates of the center. For example, the upper-leftmost sub-area of the area within which the pupil 905 may be positioned, may be mapped to the upper-rightmost area in the user FoV image 910.

The edge data network 2000 may identify an extra FoV corresponding to a mapped area in the user FoV image 910. In this case, the extra FoV image may be identified according to a direction and an extent to which the pupil 905 is relatively biased in the user FoV image 910. For example, when the position of the pupil 905 corresponds to an upper left area in the user FoV image 910, a left extra FoV image may be identified to be larger than a right extra FoV image, and an upper extra FoV image may be identified to be larger than a lower extra FoV image.

However, the disclosure is not limited thereto, and it will be understood by those skilled in the art that the edge data network 2000 may identify values of the horizontal component and the vertical component of the position of the pupil based on the height and the width of the entire area within which the pupil may be positioned, without performing a process of mapping a pupil position area to a screen area, so as to identify an extra FoV image similarly to as described above. This will be described below with reference to FIGS. 11A and 11B.

Figure 10:
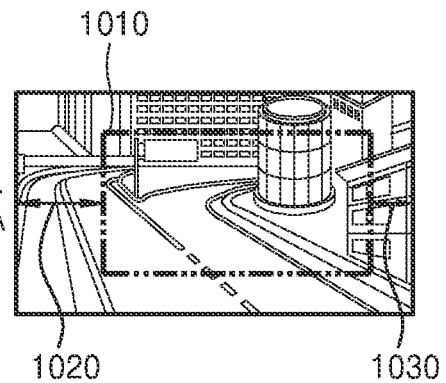
FIG. 10 is a diagram illustrating a process, performed by an edge data network, of identifying an extra FoV image based on a period of time during which a pupil stays in a predetermined area and a speed at which the pupil moves, according to an embodiment of the disclosure.

FIG. 10 is a diagram illustrating a process, performed by the edge data network, of identifying an extra FoV image based on a period of time during which a pupil stays in a certain area and a speed at which the pupil moves, according to an embodiment of the disclosure.

Referring to FIG. 10, the edge data network 2000 may identify an extra FoV 1020 in a direction corresponding to a specific area to be larger than a FoV 1030 in the opposite direction as a period of time during which the pupil stays in the certain area (e.g., an area on the left with respect to the center 1010) lengthens. The edge data network 2000 may identify the extra FoV 1020 in the direction corresponding to the moving direction of the pupil to be larger than the FoV 1030 in the opposite direction as the speed at which the pupil moves increases. In this case, when the current position of the pupil corresponds to the direction in which the pupil is biased with respect to the coordinates of the center (i.e., a pupil direction) and the direction in which the pupil moves, the edge data network 2000 may identify the extra FoV corresponding to the corresponding direction to be larger than the extra FoV corresponding to the opposite direction.

In this case, a moving distance of the pupil between the previous position of the pupil and the current position of the pupil may be identified based on coordinates of each sub-area, and a speed of movement of the pupil may be identified based on the moving distance. However, the disclosure is not limited thereto, and the current instantaneous speed of the pupil may be separately measured and identified.

The edge data network 2000 may more accurately predict a moving direction of the electronic device 1000 after the current point of time by identifying an extra FoV image considering a period of time during which the pupil stays in a certain area and a speed of movement of the pupil in addition to position information of the pupil, and secure a wide extra FoV in the moving direction of the electronic device 1000, and thus the electronic device 1000 may display a user FoV image without a delay based on a partial image including the identified extra FoV.

Figure 11A:
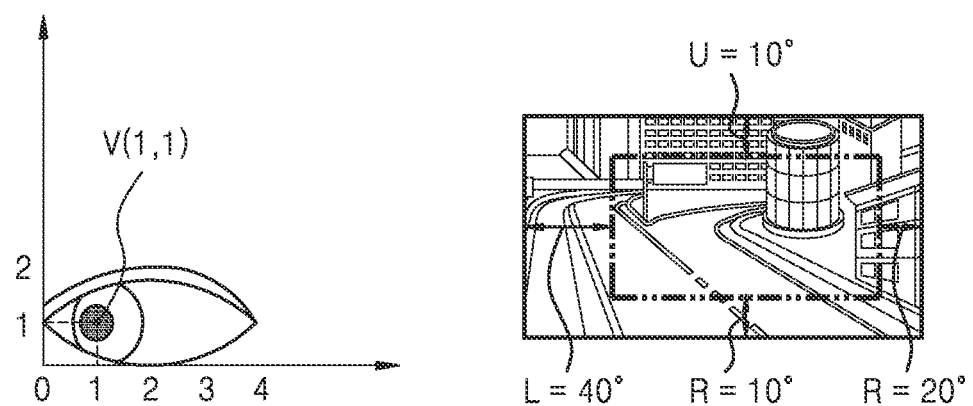
FIGS. 11A and 11B are diagrams illustrating a process, performed by an edge data network, of identifying upper, lower, left, and right extended FoVs, according to various embodiments of the disclosure.
Figure 11B:
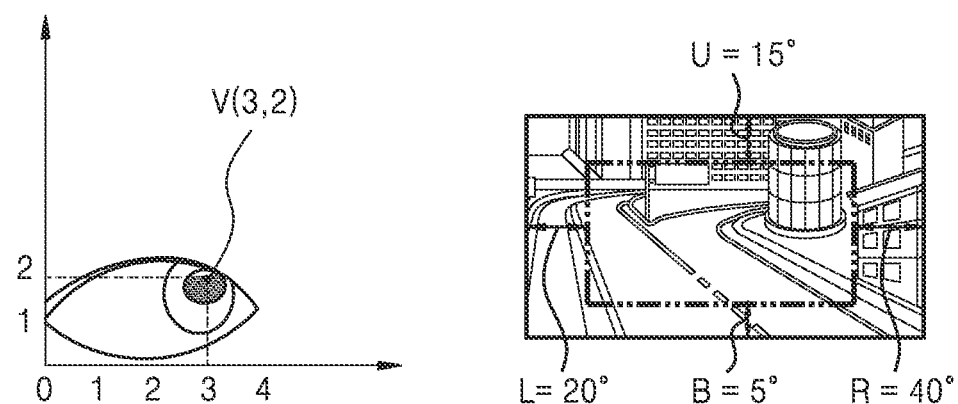

FIGS. 11A and 11B are diagrams illustrating a process, performed by the edge data network 2000, of identifying upper, lower, left, and right extended FoVs, according to various embodiments of the disclosure.

Unlike the descriptions with reference to FIGS. 8A to 8D and 9, the process, performed by the edge data network 2000, of identifying upper, lower, left, and right extended FoVs will be described with reference to FIGS. 11A and 11B on the assumption that the position of the pupil is based on a direction opposite to the reference direction described with reference to FIGS. 8A to 8D and 9. It will be understood by those skilled in the art that, by switching identified left and right extra FoVs in FIGS. 11A and 11B with each other, the left and right extra FoVs described with reference to FIGS. 8A to 8D and 9 may be identified.

The edge data network 2000 may map the entire area within which the pupil may be positioned, to an N×M coordinate system (N and M are integers greater than 1). For example, the edge data network 2000 may map the entire area within which the pupil may be positioned, to a 4×2 coordinate system. Here, information about N and M of an N×M coordinate system may be exchanged between the edge data network 2000 and the electronic device 1000 or may be preset.

The edge data network 2000 may identify a total sum of transmission extra FoVs.

For example, when a horizontal transmission extra FoV is E and a vertical transmission extra FoV is F, the edge data network 2000 may identify E as 60° and F as 20°.

The edge data network 2000 may identify minimum extra FoVs. For example, when a horizontal minimum extra FoV is e and a vertical minimum extra FoV is f, the edge data network 2000 may identify e as 10° and f as 5°. Because the electronic device 1000 may be moved in a direction opposite to the direction of the pupil, an extra FoV corresponding to the direction opposite to the direction of the pupil may not be identified as 0°, and may be identified as the same as the minimum extra FoV.

The edge data network 2000 may identify coordinates V(x,y) at which the center of the pupil is positioned, based on the position information of the pupil. A coordinate x (Vx) of the horizontal component and a coordinate y (Vy) of the vertical component in the N×M coordinate system may be identified.

The edge data network 2000 may identify left, right, upper, and lower extra FoVs L, R, U, and B based on the coordinates at which the center of the pupil is positioned.

For example, the edge data network 2000 may identify the left, right, upper, and lower extra FoVs L, R, U, and B, according to Equation 1.

$$L=(E-2e)\times(1-Vx/N)+e$$

$$R=E-L$$

$$U=F-B$$

$$B=(F-2f)\times(1-Vy/M)+f \qquad \text{Equation 1}$$

Referring to FIG. 11A, the edge data network 2000 may identify the horizontal component and the vertical component of the position of the pupil in a 4×2 coordinate system based on pupil position information. For example, the edge data network 2000 may identify Vx as 1 and Vy as 1. In this case, when E is 60°, F is 20°, e is 10°, and f is 5°, the edge data network 2000 may identify the lower extra FoV B as (20−10)×(1−1/2)+5=10°, based on Equation 1. Also, the edge data network 2000 may identify the upper extra FoV U as 20−10=10°. The edge data network 2000 may identify the left extra FoV L as (60−20)×(1−1/4)+10=40°. The edge data network 2000 may identify the right extra FoV R as 60−40=20°.

Referring to FIG. 11B, the edge data network 2000 may identify the horizontal component and the vertical component of the position of the pupil in the 4×2 coordinate system based on pupil position information. For example, the edge data network 2000 may identify Vx as 3 and Vy as 2. In this case, when E is 60°, F is 20°, e is 10°, and f is 5°, the edge data network 2000 may identify the lower extra FoV B as (20−10)×(1−2/2)+5=5°, based on Equation 1. Also, the edge data network 2000 may identify the upper extra FoV U as 20−5=15°. The edge data network 2000 may identify the left extra FoV L as (60−20)×(1−3/4)+10=20°. The edge data network 2000 may identify the right extra FoV R as 60−20=40°.

FIG. 12 is a diagram illustrating a process, performed by the edge data network, of identifying an extra FoV based on movement patterns of the pupil and head (the electronic device) of the user, according to an embodiment of the disclosure.

Referring to FIG. 12, the edge data network 2000 may identify a moving distance l2 of the head (the electronic device) per moving distance l1 of the pupil (l2/l1), in order to identify a horizontal transmission extra FoV E and a vertical transmission extra FoV F. In this case, the movement distance l1 of the pupil may refer to the movement distance of the pupil when the movement distance of the pupil over time is a local maximum or a local minimum, and the movement distance l2 of the head (the electronic device) may refer to the movement distance of the head (the electronic device) when the movement distance of the head (the electronic device) over time is a local maximum or a local minimum.

The edge data network 2000 may identify values of E and F to be greater as the value of l2/l1 increases. As the value of l2/l1 increases, the amount of a movement of the head (the electronic device) in an identified pattern of the user also increases, and a large extra FoV may be identified considering the identified pattern of the user.

The edge data network 2000 may identify an average value of differences between points of time ti at which the pupil moves and points of time ui at which the head (the electronic device) moves during an entire period of time T, in order to identify the horizontal transmission extra FoV E and the vertical transmission extra FoV F. For example, the edge data network 2000 may identify a time difference average between the pupil and the head (the electronic device) according to Equation 2.

Time difference average between pupil and $\qquad$ Equation 2

$$\text{head} = \frac{\sum_{i=1}^{T}(ui - ti)}{T}$$

Here, ui may denote a point of time at which the moving distance of the pupil over time is a local maximum or a local minimum, and ti may denote a point of time when the moving distance of the head (the electronic device) over time is a local maximum or a local minimum.

The edge data network 2000 may identify values of E and F to increase as the time difference average between the pupil and the head decreases. That is, as the time difference average between the pupil and the head decreases, the correspondence between the movement of the pupil and the movement of the head in the identified pattern of the user may increase, and a large extra FoV may be identified considering the identified pattern of the user.

In this case, the edge data network 2000 may calculate extended FoVs corresponding to respective average values for each range in advance, and identify an extended FoV corresponding to a certain average value based on the extended FoVs calculated in advance. The extended FoVs calculated in advance may be stored in the form of a lookup table (LUT). For example, when the average value is in a range of 0 msec to 10 msec (Range 1), the edge data network 2000 may obtain a corresponding extended FoV of 170° calculated in advance. When the average value is in a range of 10 msec to 20 msec (Range 2), the edge data network 2000 may obtain a corresponding extended FoV of 130° calculated in advance. When the average value is in a range of 20 msec to 30 msec (Range 3), the edge data network 2000 may obtain a corresponding extended FoV of 115° calculated in advance. Here, the extended FoVs corresponding to the ranges of average values may be stored in the form of a LUT Table 1 as follows.

TABLE 1

| Range | Average value | Extended FoV |
| --- | --- | --- |
| Range 1 | 0 to 10 ms | 170° |
| Range 2 | 10 ms to 20 ms | 130° |
| Range 3 | 20 ms to 30 ms | 115° |

The edge data network 2000 may identify a weight value W applied to an extra FoV in the left or right direction (e.g., the left direction). W may increase or decrease according to the correspondence between the previous position of the pupil (the pupil direction) and the moving direction of the head (the electronic device). For example, the edge data network 2000 may decrease W when the head (the electronic device) is moved in a direction opposite to the previous position of the pupil (the pupil direction), and may increase W when the head (the electronic device) is moved in the same direction as the direction of the previous position of the pupil.

In this case, the edge data network 2000 may identify the left extra FoV L and the right extra FoV R according to Equation 3.

$$L=\{(E-2e)\times(1-Vx/N)+e\}*W$$

$$R=(E-L)*(1-W) \quad \text{Equation 3}$$

Figure 13:
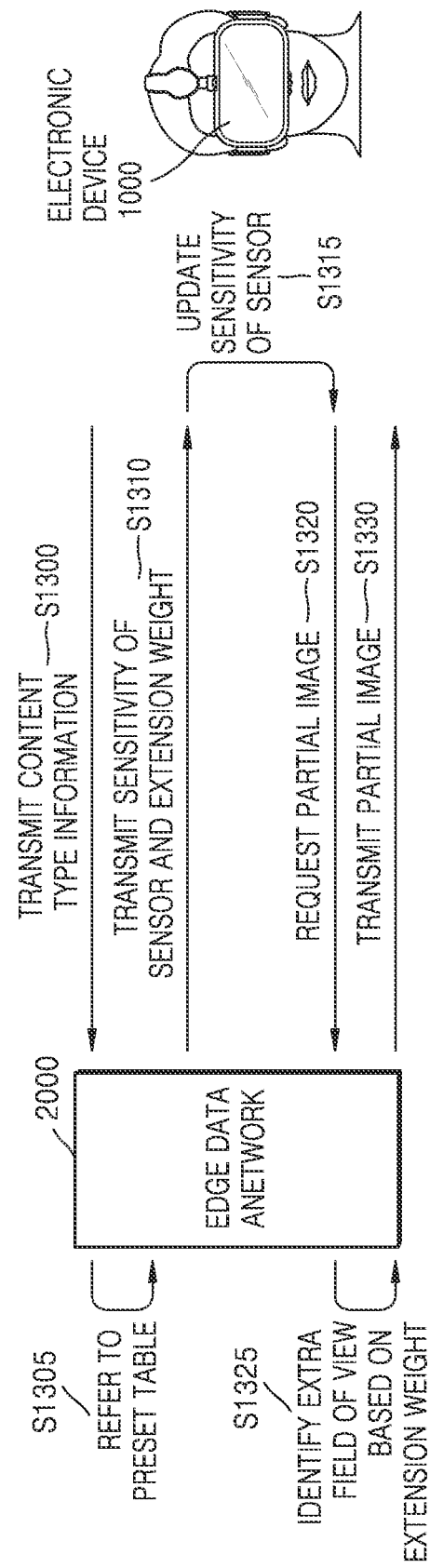
FIG. 13 is a diagram illustrating a process, performed by an edge data network, of identifying an extra FoV and sensitivity of a sensor according to the type of video content, according to an embodiment of the disclosure.

FIG. 13 is a diagram illustrating a process, performed by the edge data network 2000, of identifying an extra FoV and a sensitivity of a sensor according to the type of video content, according to an embodiment of the disclosure.

Referring to FIG. 13, in operation S1300, the electronic device 1000 may transmit video content type information to the edge data network 2000. For example, content type information contentType may indicate "Game". Information about a video content type may be transmitted to the edge data network 2000 before the video content is transmitted after a network connection is established, e.g., when a video-related application is executed. However, the disclosure is not limited thereto, and the information about a video content type may be transmitted to the edge data network 2000 whenever the video content being reproduced is changed to another.

In operation S1305, the edge data network 2000 may identify a sensitivity (of a camera sensor, an orientation sensor, or the like) and an extension weight corresponding to the video content type information by referring to a preset table (e.g., a lookup table). For example, 'Type1' indicated by the video content type information may indicate a game video, and because a significant number of movements of the pupil and the head (the electronic device) are involved due to the characteristics of the content, a horizontal extra FoV E and a vertical extra FoV F may be identified to be relatively large, and the sensitivity may be increased. For example, 'Type2' indicated by the video content type information may indicate a concert or sport game video, and because the corresponding video has clear front and rear due to the characteristics of the content, a few movements of the pupil and the head (the electronic device) are involved and FoVs corresponding to the movements are expected to be limited in the front direction, the horizontal extra FoV E and the vertical extra FoV F may be identified to be relatively small, and the sensitivity may be decreased. For example, 'Type3' indicated by the video content type information may indicate a landscape or virtual travel video, and because the front and rear of the corresponding video are expected to be equally viewed by the user due to the characteristics of the content and the speed of movement of the pupil and the head (the electronic device) is expected to be low, the horizontal extra FoV E and the vertical extra FoV F may be identified to be smaller than those of 'Type1' and larger than those of 'Type2', and the sensitivity may be identified to be less than that of 'Type1' and greater than that of 'Type2'.

Here, an increase or decrease in the extra FoV may be adjusted according to an increase or decrease in the extension weight. The edge data network 2000 may set sensitivities and extension weights corresponding to video content types as shown in Table 2.

TABLE 2

| Type | Sensitivity (times per second) | Extension weight |
|---|---|---|
| Game | 200 | 1.2 |
| Landscape | 100 | 1.0 |
| Sports | 50 | 0.7 |

In operation S1310, the edge data network 2000 may transmit the sensitivity and the extension weight to the electronic device 1000. For example, information indicating that the sensitivity is 200 (times per second) and the extension weight is 1.2 may be transmitted to the electronic device 1000. In this case, the information may be transmitted to the electronic device 1000 in the form of an index indicating one sensitivity or extension weight among a plurality of candidate sensitivities or a plurality of candidate extension weights, but is not limited thereto. Here, only sensitivity information may be transmitted, and extension weight information may not be transmitted. In operation S1315, the electronic device 1000 may update the sensitivity based on the sensitivity information. For example, according to information indicating that the sensitivity is 200 (times per second), the sensitivity may be updated to 200 (times per second).

In operation S1320, the electronic device 1000 may transmit a new frame transmission request to the edge data network 2000 based on the orientation information and the pupil position information detected through the sensing module.

In operation S1325, the edge data network 2000 may identify extra FoVs based on the extension weight. For example, the edge data network 2000 may first identify a total sum of left and right extra FoVs or a total sum of upper and lower extra FoVs, and then identify a final total sum of the left and right or upper and lower extra FoVs by multiplying the total sum of the left and right extra FoVs or the total sum of the upper and lower extra FoVs by the extension weight. For example, when the video content type is game, the extension weight may be 1.2, the total sum of the left and right or upper and lower extra FoVs corresponding to the pupil position information may be identified as 40°, each of the upper and lower extra FoVs may be identified as 20°, and the final total sum of the left and right extra FoVs considering the extension weight may be identified as 48°, and each of the upper and lower extra FoVs may be identified as 24°.

In operation S1330, the edge data network 2000 may transmit, to the electronic device 1000, a partial image having the left and right or upper and lower extra FoVs identified based on the extension weight. In this case, information indicating the left and right or upper and lower extra FoVs identified based on the extension weight may be transmitted to the electronic device 1000.

As described above, the edge data network 2000 may receive the information about the video content type from the electronic device 1000, and may identify the extension weight for identifying the size of an extended area based on the information. Therefore, a bandwidth may be saved by preventing unnecessary image transmission, and the quality of an image transmitted in a relatively limited bandwidth environment may be improved. In addition, the edge data network 2000 may receive the information about the video content type from the electronic device 1000, identify the sensitivity of the sensor based on the information, and effectively manage the power consumed by the electronic device 1000. For example, when the video content type is a landscape video, the edge data network 2000 may predict that the amount of the user's FoV movements is low, and thus decrease the sensitivity of the sensor to reduce the frequency at which information is obtained by using the sensor thereby reducing the power consumed by the electronic device 1000.

Figure 14:
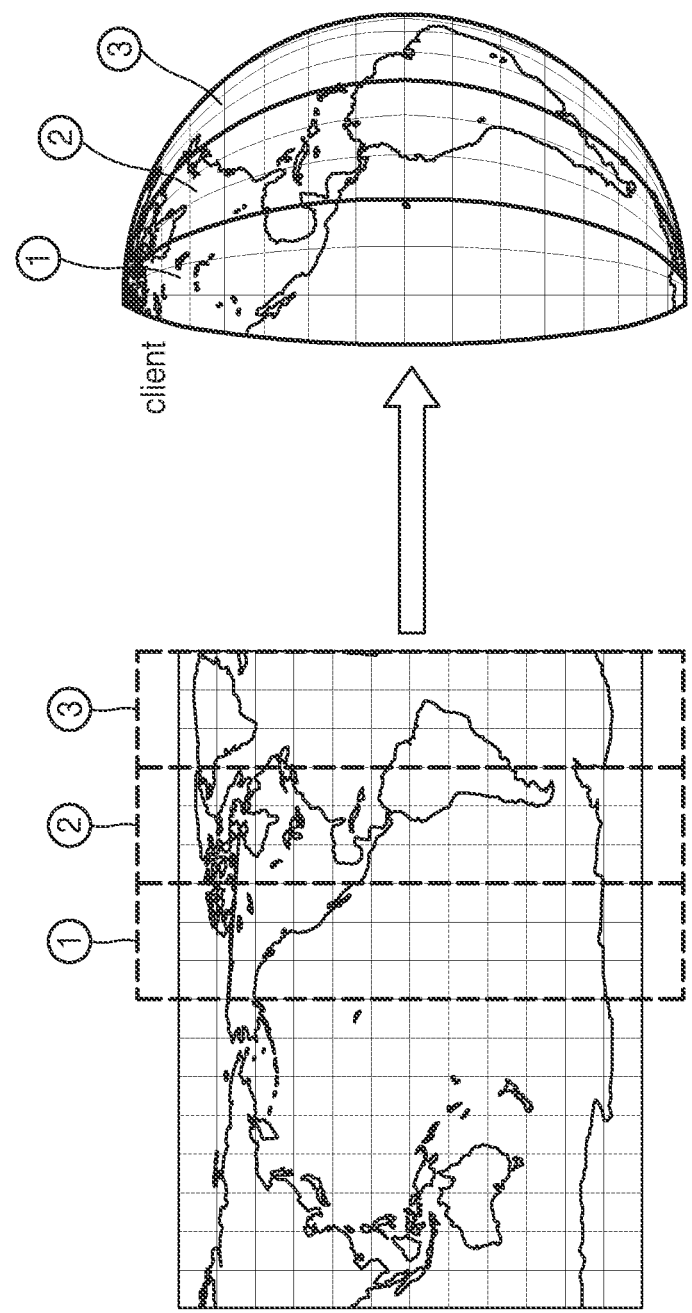
FIG. 14 is a diagram illustrating a process, performed by an edge data network, of transmitting, to an electronic device, a first partial image in several data units, according to an embodiment of the disclosure.

FIG. 14 is a diagram illustrating a process, performed by the edge data network, of transmitting, to the electronic device, a first partial image in several data units, according to an embodiment of the disclosure.

Referring to FIG. 14, the edge data network 2000 may divide a VR imagine the vertical direction (e.g., the longitude) to obtain several data units, select one or more data units ①, ②, and ③ as much as required FoVs, from among the several data units in a process of obtaining the first partial image, encode the selected one or more data units, and transmit the encoded result to the electronic device 1000.

Figure 15:
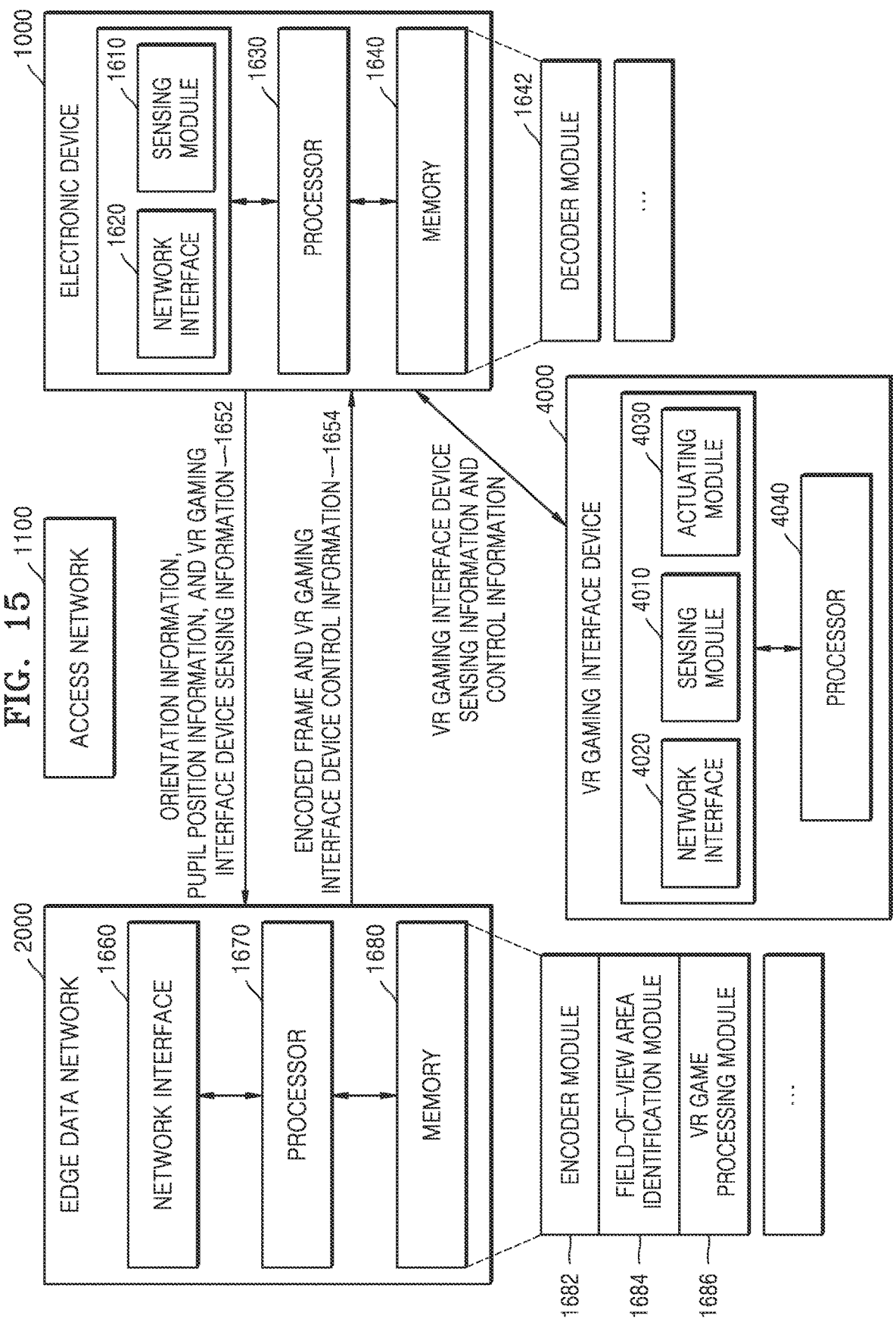
FIG. 15 is a diagram schematically illustrating a procedure of operation between an electronic device, an edge data network, and a virtual reality (VR) gaming interface device according to an embodiment of the disclosure.

FIG. 15 is a diagram schematically illustrating an operation procedure between the electronic device, the edge data network, and a VR gaming interface device according to an embodiment of the disclosure.

Referring to FIG. 15, unlike FIG. 5, the VR gaming interface device 4000 is further illustrated. In the case of the VR gaming field, unlike the VR streaming field, user interaction is involved, and accordingly, the VR gaming interface device 4000 may be used in addition to the electronic device 1000.

The operation procedure between the electronic device and the edge data network in the VR streaming field is described above with reference to FIG. 5, and thus a repetitive description will be omitted. In particular, the components 1660, 1670, 1680, 1682, and 1684 of the edge data network 2000, and the components 1610, 1620, 1630, 1640, and 1642 of the electronic device 1000 correspond to the similar components described above, and the description thereof is omitted. The operation procedure between the electronic device, the edge data network, and the VR gaming interface device in the VR gaming field is described below.

The edge data network 2000 may generate a VR game image (an interactive VR image) included in a VR sequence based on instructions of a VR game processing module 1686.

The VR game processing module 1686 may store instructions for generating the first partial image of the VR game image based on orientation information, pupil position information, and VR gaming interface device sensing information 1652. The VR game processing module 1686 may store instructions for outputting the VR gaming interface device control information 1654.

The electronic device 1000 may transmit the VR gaming interface device sensing information 1652 to the edge data network 2000 for VR game processing. In this case, the electronic device 1000 may receive the VR gaming interface device sensing information from the VR gaming interface device 4000.

The VR gaming interface device 4000 may include a network interface 4020, a sensing module 4010, an actuating module 4030, and a processor 4040. The network interface 4020 may be a module for communicating with the outside, and the sensing module 4010 may be a module for sensing a motion of the user. The sensing module 4010 may obtain the VR gaming interface device sensing information.

The actuating module 4030 may be a module that provides the user with various types of outputs (e.g., haptic feedback) such as vibrations. The actuating module 4030 may provide the user with various types of outputs to the user based on VR gaming interface device sensing control information.

The VR gaming interface device 4000 may transmit the VR gaming interface device sensing information to the electronic device 1000. In addition, the VR gaming interface device 4000 may receive the VR gaming interface device control information from the electronic device 1000.

It is described above that the VR interface device sensing information may be transmitted to the edge data network 2000 via the electronic device 1000, and the VR interface device sensing information and the VR gaming interface device control information may be transmitted to the VR gaming interface device 4000 via the electronic device 1000, but the disclosure is not limited thereto, and they may be directly exchanged between the VR gaming interface device 4000 and the edge data network 2000. In this case, synchronization information for synchronization with the electronic device 1000 may be also transmitted.

Although the operation procedure between the electronic device, the edge data network, and the VR gaming interface device in the VR gaming field is described above with respect to FIG. 15, the disclosure is not limited thereto, and it will be understood by those skilled in the art that interactive VR may be mainly utilized in many fields in which a user may directly intervene in content and perform activities, e.g., simulation, training, or the like.

Figure 16:
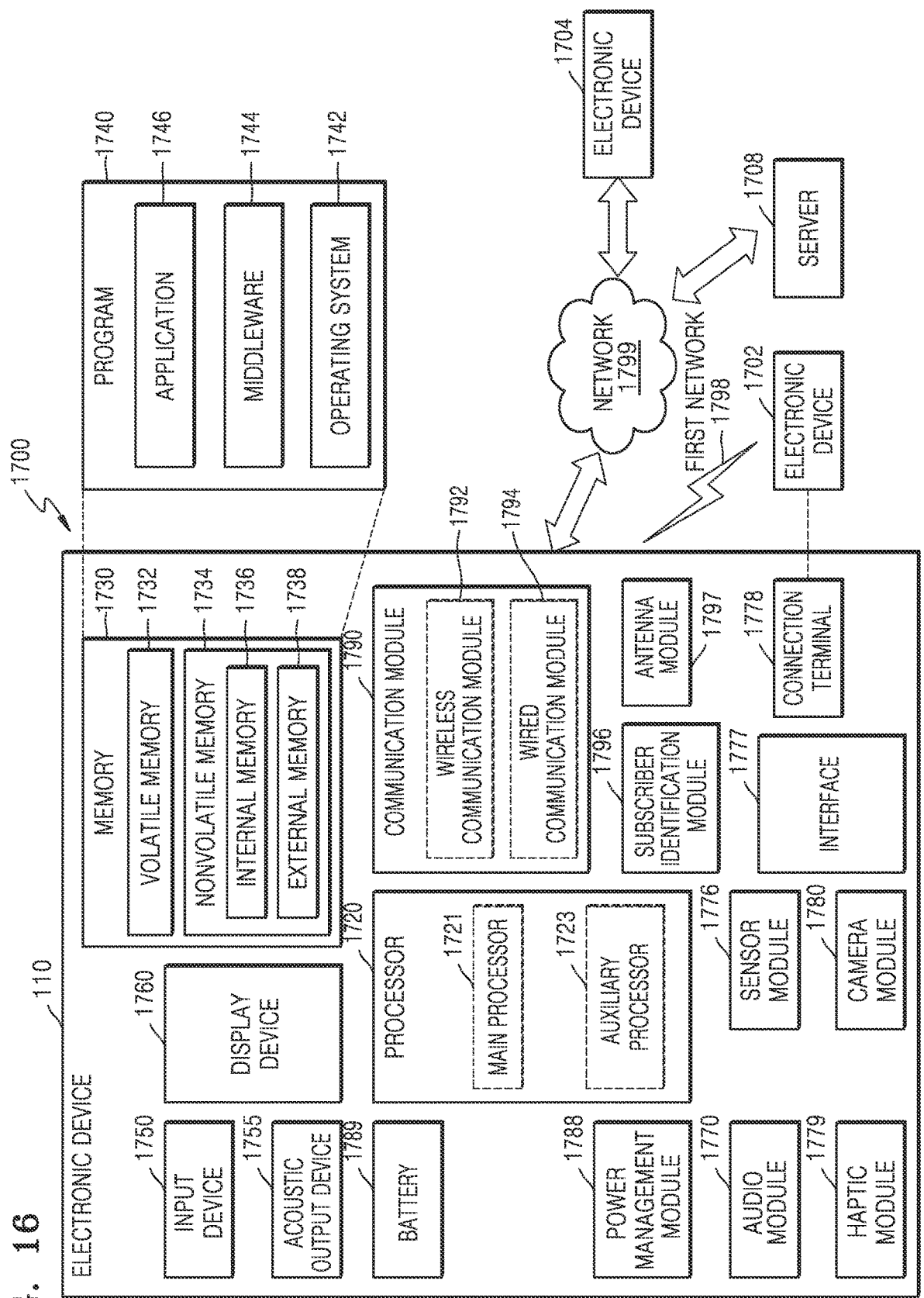
FIG. 16 is a block diagram of an electronic device according to an embodiment of the disclosure.

FIG. 16 is a block diagram of an electronic device according to an embodiment of the disclosure.

Referring to FIG. 16, the electronic device connected to the edge data network of FIGS. 1 to 7, 8A, 8B, 8C, 8D, 9, 10, 11A, 11B, 12, 13, 14, and 15 may correspond to the electronic device 110 of FIG. 16. For example, in the network environment 1700, the electronic device 110 may communicate with an electronic device 1702 (here, the electronic device includes the VR gaming interface device) via a first network 1798 (e.g., a short-range wireless communication network), or may communicate with an electronic device 1704 or a server 1708 via a second network 1799 (e.g., a long-range wireless communication network). According to an embodiment of the disclosure, the electronic device 110 may communicate with the electronic device 1704 via the server 1708. The electronic device 110 may include a processor 1720, a memory 1730, an input device 1750, an acoustic output device 1755, a display device 1760, an audio module 1770, a sensor module 1776, an interface 1777, a haptic module 1779, a camera module 1780, a power management module 1788, a battery 1789, a communication module 1790, a subscriber identification module 1796, and an antenna module 1797. In some embodiments of the disclosure, in the electronic device 110, at least one (e.g., the display device 1760 or the camera module 1780) of the components may be omitted, or one or more other components may be further included. In some embodiments of the disclosure, some of the components may be implemented as an integrated circuit. For example, the sensor module 1776 (e.g., a fingerprint sensor, an iris sensor, or an illuminance sensor) may be implemented by being embedded in the display device 1760 (e.g., a display).

The processor 1720 may execute, for example, software (e.g., a program 1740) to control at least one other component (e.g., a hardware or software component) of the electronic device 110, which is connected to the processor 1720, and perform various kinds of data processing or computation. According to an embodiment of the disclosure, as at least a portion of the data processing or computation, the processor 1720 may load, in a volatile memory 1732, a command or data received from another component (e.g., the sensor module 1776 or the communication module 1790), process the command or data stored in the volatile memory 1732, and store result data in a nonvolatile memory 1734.

According to an embodiment of the disclosure, the processor 1720 may execute an application client, and according to the execution of the application client, the processor 1720 may transmit, to the edge data network 2000, a request message for checking a network protocol to be used by the application client. In addition, the processor 1720 may receive, from the edge data network 2000, a response message indicating the network protocol to be used by the application client. The processor 1720 may update a network protocol to be used by a UE application, based on the response message. The processor 1720 may select a network socket corresponding to the updated network protocol. The processor 1720 may receive data generated for the application client, from the edge data network 2000 by using the selected network socket.

According to an embodiment of the disclosure, the processor 1720 may include a main processor 1721 (e.g., a central processing unit (CPU) or an application processor (AP)) and an auxiliary processor 1723 (e.g., a graphics processing unit (GPU), an image signal processor (ISP), a sensor hub processor, or a communication processor (CP)) operable independently from or together with the main processor 1721. Additionally or substitutionally, the auxiliary processor 1723 may be configured to use lower power than the main processor 1721 or to be specialized to a designated function. The auxiliary processor 1723 may be implemented separately from or as a portion of the main processor 1721.

The auxiliary processor 1723 may control at least some of functions or states related to at least one (e.g., the display device 1760, the sensor module 1776, or the communication module 1790) of the components in the electronic device 110 instead of the main processor 1721 while the main processor 1721 is in an inactive state (e.g., a sleep state) or together with the main processor 1721 while the main processor 1721 is in an active state (e.g., executing an application). According to an embodiment of the disclosure, the auxiliary processor 1723 (e.g., an ISP or a CP) may be implemented as a portion of another component (e.g., the camera module 1780 or the communication module 1790) functionally associated with the auxiliary processor 1723.

The memory 1730 may store various data to be used by at least one component (e.g., the processor 1720 or the sensor module 1776) in the electronic device 110. The data may include, for example, software (e.g., the program 1740) and input data or output data related to a command associated with the software. The memory 1730 may include the volatile memory 1732 and the nonvolatile memory 1734. The nonvolatile memory 1734 may include internal memory 1736 and external memory 1738.

The program 1740 may be stored as software in the memory 1730 and may include, for example, an operating system (OS) 1742, middleware 1744, and an application 1746. According to an embodiment of the disclosure, the program 1740 may include the first application client 122 and the second application client 124 of FIG. 1. In addition, the program 1740 may include the edge enabler client 130 of FIG. 1.

The input device 1750 may receive, from the outside of the electronic device 110, a command or data to be used for a component (e.g., the processor 1720) in the electronic device 110.

The acoustic output device 1755 may output an acoustic signal to the outside of the electronic device 110. The acoustic output device 1755 may include, for example, a speaker. The speaker may be used for a general usage such as multimedia reproduction or recording replay.

The display device 1760 may visually provide information to the outside (e.g., a user) of the electronic device 110. The display device 1760 may include, for example, a display, a hologram device, or a projector and a control circuitry configured to control a corresponding device. According to an embodiment of the disclosure, the display device 1760 may include a touch circuitry configured to detect a touch or a sensor circuitry (e.g., a pressure sensor) configured to measure a strength of a force generated by the touch.

The audio module 1770 may convert a sound into an electrical signal or vice versa. According to an embodiment of the disclosure, the audio module 1770 may obtain a sound through the input device 1750 or output a sound through the acoustic output device 1755 or an external electronic device (e.g., the electronic device 1702 (e.g., a speaker or headphones)) directly or wirelessly connected to the electronic device 110.

The sensor module 1776 may detect an operating state (e.g., power or a temperature) of the electronic device 110 or an external environment state (e.g., a user state) and generate an electrical signal or a data value corresponding to the detected state. According to an embodiment of the disclosure, the sensor module 1776 may include, for example, a gesture sensor, a gyro sensor, a barometer sensor, a magnetic sensor, an acceleration sensor, a grip sensor, a proximity sensor, a color sensor (e.g., an RGB (red, green, blue) sensor), an infrared (IR) sensor, a biometric sensor, a temperature sensor, a humidity sensor, an illuminance sensor, or sensors related to an autonomous vehicle (e.g., an inertia measurement unit (IMU), a global positioning system (GPS) sensor, a camera, a light imaging detection and ranging (LIDAR) sensor, and a radio detection and ranging (RADAR) sensor).

The interface 1777 may support one or more designated protocols usable to be directly or wirelessly connected to an external electronic device (e.g., the electronic device 1702) of the electronic device 110.

A connection terminal 1778 may include a connector through which the electronic device 110 is physically connectable to an external electronic device (e.g., the electronic device 1702).

The haptic module 1779 may convert an electrical signal into a mechanical stimulus (e.g., vibrations or a motion) or an electrical stimulus of which the user may be aware through a tactile or movement sensation.

The camera module 1780 may capture a still image or a moving picture. According to an embodiment of the disclosure, the camera module 1780 may include one or more lenses, image sensors, ISPs, or flashes.

The power management module 1788 may manage power to be supplied to the electronic device 110.

The battery 1789 may supply power to at least one component in the electronic device 110.

The communication module 1790 may establish a direct (e.g., wired) communication channel or a wireless communication channel between the electronic device 110 and an external electronic device (e.g., the electronic device 1702, the electronic device 1704, or the server 1708) and support communication through the established communication channel. The communication module 1790 may include one or more communication processors operating independently from the processor 1720 (e.g., an AP) and supporting direct (e.g., wired) communication or wireless communication. According to an embodiment of the disclosure, the communication module 1790 may include a wireless communication module 1792 (e.g., a cellular communication module, a short-range communication module, or a global navigation satellite system (GNSS) communication module) and a wired communication module 1794 (e.g., a local area network (LAN) communication module or a power line communication module). A corresponding communication module among these communication modules may communicate with an external electronic device over the first network 1798 (e.g., a short-range communication network such as Bluetooth, Wi-Fi direct, or infrared data association (IrDA)) or the second network 1799 (e.g., a long-range communication network such as a cellular network, the Internet, or a computer network (e.g., a LAN or a wide area network (WAN)). These types of communication modules may be integrated into one component (e.g., a single chip) or implemented by a plurality of separate components (e.g., a plurality of chips).

The wireless communication module 1792 may verify or authenticate the electronic device 110 in a communication network such as the first network 1798 or the second network 1799 by using subscriber information (e.g., an international mobile subscriber identity (IMSI)) stored in the subscriber identification module 1796.

The antenna module 1797 may transmit a signal or power to the outside (e.g., an external electronic device) or receive a signal or power from the outside.

At least some of the components may be connected to each other in a peripheral device communication scheme (e.g., a bus, a general-purpose input and output (GPIO), a serial peripheral interface (SPI), or a mobile industry processor interface (MIPI)) and exchange a signal (e.g., a command or data) with each other.

According to an embodiment of the disclosure, a command or data may be transmitted or received between the electronic device 110 and the external electronic device 1704 via the server 1708 connected over the second network 1799. Each of the electronic devices 1702 and 1704 may be the same or different type as or from that of the electronic device 110.

According to an embodiment of the disclosure, all or some of operations executed by the electronic device 110 may be executed by one or more external devices among the electronic devices 1702 and 1704 and the server 1708. For example, when the electronic device 110 is supposed to perform a certain function or service automatically or in response to a request from a user or another device, the electronic device 110 may request one or more of the external electronic devices 1702 and 1704 to perform at least a portion of the function or service, additionally or instead of autonomously executing the function or the service. The one or more of the external electronic devices 1702 and 1704 having received the request may execute at least a portion of the requested function or service or an additional function or service related to the request and deliver a result of the execution to the electronic device 110. The electronic device 110 may provide the result as it is or additionally process the result, and then may provide the result as at least a portion of a response to the request. To this end, for example, cloud computing, distributed computing, or client-server computing may be used.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method, performed by an edge data network, of transmitting video content, the method comprising:
    obtaining, from an electronic device connected to the edge data network, sensor information including orientation information of a user's gaze and pupil position information based on a center in an entire user eye area;
    obtaining prediction information for rotation of the electronic device based on the pupil position information;
    obtaining a first partial image including a user field-of-view image and an extra field-of-view image, wherein the user field-of-view image corresponds to the orientation information of the user's gaze, and wherein the extra field-of-view image corresponds to the prediction information for the rotation of the electronic device;
    generating a first frame by encoding the first partial image; and
    transmitting the generated first frame to the electronic device,
    wherein the extra field-of-view image corresponding to the prediction information for the rotation of the electronic device is an image having an extra field of view identified based on a ratio of a pupil position over time at a local maximum to an electronic device position over time at a local maximum.

2. The method of claim 1, wherein the user field-of-view image is an image having a user field of view identified based on information about a viewport area of a display of the electronic device, based on a position in a virtual reality (VR) image indicated by the orientation information of the user's gaze.

3. The method of claim 1, wherein the extra field-of-view image based on the prediction information for the rotation of the electronic device is an image having an extra field of view identified based on coordinates of a position of a pupil with respect to a reference point indicated by the pupil position information.

4. The method of claim 3,
    wherein an extra field of view is identified based on a pupil direction and a pupil distance that are identified from coordinates of the center in the entire user eye area and the coordinates of the position of the pupil, and
    wherein the extra field-of-view image is an image having the identified extra field of view.

5. The method of claim 3,
    wherein an extra field of view corresponding to at least one of a horizontal component or a vertical component of the coordinates of the position of the pupil with respect to at least one of a width or a height of an entire user eye area is identified, and
    wherein the extra field-of-view image is an image having the identified extra field of view.

6. The method of claim 5,
    wherein left and right first extra fields of view, which correspond to the horizontal component of the position of the pupil, and upper and lower second extra fields of view, which correspond to the vertical component of the position of the pupil, are identified, and
    wherein the extra field-of-view image is an image having the identified left and right first extra fields of view and the identified upper and lower second extra fields of view.

7. The method of claim 6,
wherein a left or right extra field of view of the first extra fields of view is greater than or equal to a first minimum field of view,
wherein an upper or lower extra field of view of the second extra fields of view is greater than or equal to a second minimum field of view, and
wherein the first minimum field of view and the second minimum field of view are preset.

8. The method of claim 4, wherein an extra field of view in a direction corresponding to the pupil direction, based on a user field of view, is greater than an extra field of view in a direction opposite to the direction corresponding to the pupil direction.

9. The method of claim 1, wherein the extra field-of-view image corresponding to the prediction information for the rotation of the electronic device is an image having an extra field of view identified based on at least one of a previous position of a pupil, a period of time during which a position of the pupil is in a predetermined area, or a speed of movement of the pupil.

10. The method of claim 1,
wherein the pupil position includes a position of a pupil over time local minimum position, and
wherein the electronic device position includes a position of the electronic device over time a local minimum position.

11. The method of claim 1, wherein the extra field-of-view image corresponding to the prediction information for the rotation of the electronic device is an image having an extra field of view identified based on a field of view weight of a predetermined direction based on a position of a pupil and a displacement direction of the electronic device.

12. The method of claim 1, wherein the extra field-of-view image corresponding to the prediction information for the rotation of the electronic device is an image having an extra field of view identified based on a difference between a point of time at which a position of a pupil over time is a local maximum position or a local minimum position, and a point of time at which a position of the electronic device over time is a local maximum position or a local minimum position.

13. The method of claim 1,
wherein based on information about a type of video content related to the first partial image received by the electronic device, an extension weight of an extra field of view and a sensitivity of a sensor included in the electronic device are identified, and
wherein information about the extension weight of the extra field of view and the sensitivity of the sensor is transmitted to the electronic device.

14. The method of claim 1,
wherein the first partial image is composed of data units of a preset field-of-view range, and
wherein the generating of the first frame by encoding the first partial image comprises:
encoding a first data unit of at least one preset field-of-view range corresponding to the user field-of-view image in the first partial image, and a second data unit of at least one preset field-of-view range corresponding to the extra field-of-view image in the first partial image, and
generating the first frame including the encoded first data unit and the encoded second data unit.

15. An edge data network for transmitting video content to an electronic device, the edge data network comprising:
a network interface;
a memory storing one or more instructions; and
a processor configured to execute the one or more instructions,
wherein the processor is further configured to, by executing the one or more instructions:
obtain, from the electronic device connected to the edge data network, sensor information including orientation information of a user's gaze and based on pupil position information based on a center in an entire user eye area,
obtain prediction information for rotation of the electronic device based on the pupil position information,
obtain a first partial image including a user field-of-view image corresponding to the orientation information of the user's gaze and an extra field-of-view image corresponding to the prediction information for the rotation of the electronic device,
generate a first frame by encoding the first partial image, and
transmit the generated first frame to the electronic device, and
wherein the extra field-of-view image corresponding to the prediction information for the rotation of the electronic device is an image having an extra field of view identified based on a ratio of a pupil position over time at a local maximum to an electronic device position over time at a local maximum.

16. The method of claim 1, wherein the pupil position information is measured by using a camera or a separate pupil position sensor.

* * * * *